US012752756B2

(12) United States Patent
Kato et al.

(10) Patent No.: US 12,752,756 B2
(45) Date of Patent: Oct. 6, 2026

(54) DISC BRAKE DEVICE

(71) Applicant: AKEBONO BRAKE INDUSTRY CO., LTD., Tokyo (JP)

(72) Inventors: Hiroyuki Kato, Tokyo (JP); Michio Suzuki, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 931 days.

(21) Appl. No.: 18/017,188

(22) PCT Filed: Jul. 16, 2021

(86) PCT No.: PCT/JP2021/026884
§ 371 (c)(1),
(2) Date: Jan. 20, 2023

(87) PCT Pub. No.: WO2022/019245
PCT Pub. Date: Jan. 27, 2022

(65) Prior Publication Data

US 2023/0286480 A1 Sep. 14, 2023

(30) Foreign Application Priority Data

Jul. 22, 2020 (JP) ................................ 2020-125242

(51) Int. Cl.
*B60T 13/74* (2006.01)
*B60T 1/06* (2006.01)
(Continued)

(52) U.S. Cl.
CPC ............ *B60T 13/588* (2013.01); *B60T 1/065* (2013.01); *B60T 13/746* (2013.01);
(Continued)

(58) Field of Classification Search
CPC ...... F16D 55/226; F16D 55/228; F16D 65/18; F16D 65/183; B60T 1/065; B60T 13/741
See application file for complete search history.

(56) References Cited

U.S. PATENT DOCUMENTS 9,850,971 B1 12/2017 Demorais et al.
2017/0191540 A1* 7/2017 Ishikawa ................ F16D 65/38
(Continued)

FOREIGN PATENT DOCUMENTS

JP H03-069719 U 7/1991
JP 2015-025550 A 2/2015
(Continued)

OTHER PUBLICATIONS

Extended European Search Report issued Jun. 27, 2024 in Application No. 21845198.7.
(Continued)

*Primary Examiner* — Nicholas J Lane
(74) *Attorney, Agent, or Firm* — Faegre Drinker Biddle & Reath LLP

(57) ABSTRACT

A disc brake device includes a pad, a caliper including a cylinder, a piston, and a rotary-to-linear motion conversion mechanism. The piston is divided into two parts that are a piston main body and a piston cap. The rotary-to-linear motion conversion mechanism includes a rotary member and a linear motion member. A unidirectional rotation regulating portion between the piston main body and the piston cap is configured to regulate relative rotation of the piston main body in a forward rotation direction with respect to the piston cap when the rotary member is driven to rotate in the forward rotation direction, and to allow relative rotation of the piston main body in a reverse rotation direction with respect to the piston cap when the rotary member is driven to rotate in the reverse rotation direction.

15 Claims, 21 Drawing Sheets

(51) Int. Cl.

| | |
|---|---|
| ***B60T 13/58*** | (2006.01) |
| ***F16D 55/226*** | (2006.01) |
| ***F16D 55/228*** | (2006.01) |
| ***F16D 65/18*** | (2006.01) |
| *F16D 121/04* | (2012.01) |
| *F16D 121/24* | (2012.01) |
| *F16D 125/06* | (2012.01) |
| *F16D 125/40* | (2012.01) |

(52) U.S. Cl.

CPC ......... *F16D 55/226* (2013.01); *F16D 55/228* (2013.01); *F16D 65/18* (2013.01); *F16D 65/183* (2013.01); *F16D 2121/04* (2013.01); *F16D 2121/24* (2013.01); *F16D 2125/06* (2013.01); *F16D 2125/40* (2013.01)

(56) References Cited

U.S. PATENT DOCUMENTS

2019/0383336 A1* 12/2019 Noguchi ............... F16D 55/226
2020/0332849 A1* 10/2020 Barbosa .............. F16D 65/0979

FOREIGN PATENT DOCUMENTS

JP 2017-155774 A 9/2017
JP 2018-184093 A 11/2018

OTHER PUBLICATIONS

International Search Report mailed Aug. 31, 2021 for PCT/JP2021/026884.
Written Opinion mailed Aug. 31, 2021 for PCT/JP2021/026884.

* cited by examiner

DISC BRAKE DEVICE

TECHNICAL FIELD

The present invention relates to a disc brake device.

BACKGROUND ART

Since a disc brake device is excellent in heat dissipation and can finely adjust a braking force during traveling, the number of cases in which the disc brake device is adopted not only for front wheels of an automobile but also for rear wheels of the automobile is increased.

The disc brake device can be roughly divided into a hydraulic disc brake device that uses hydraulic oil to obtain a braking force and an electric disc brake device that uses an actuator that can be electrically driven to obtain a braking force.

As an electric disc brake device, as disclosed in JP2018-184093A and the like, an electric parking brake type structure is known in which a braking force of a service brake is generated by feeding brake oil (fluid) into a cylinder, and a braking force of a parking brake is generated using an electric actuator such as a rotary-to-linear motion conversion mechanism.

In an electric parking brake type disc brake device, the brake oil is accommodated in the cylinder, and thus, a pad heats up when pressed against a rotating rotor, heat is transferred to the brake oil via a piston, and the temperature of the brake oil is likely to rise. When the temperature of the brake oil rises, deterioration of the brake oil is caused, which causes a vapor lock phenomenon.

Therefore, in order to make it difficult for heat to be transferred from the pad to the brake oil, the piston may be used as a divided structure as disclosed in JP2015-25550A. Specifically, the piston may include a piston main body that is fitted to the cylinder and receives a hydraulic pressure, and a piston cap that presses the pad. According to this configuration, the amount of heat transferred to the brake oil can be reduced as compared with a case where the piston has an integral structure. Therefore, it is possible to prevent an increase in temperature of the brake oil.

CITATION LIST

Patent Literature

Patent Literature 1: JP2018-184093A
Patent Literature 2: JP2015-25550A

SUMMARY OF INVENTION

Technical Problem

In the structure described in JP2015-25550A, the piston main body and the piston cap are coupled to each other by fitting a convex portion provided in the piston cap into a concave portion provided in the piston main body. However, when such a coupling structure of the piston main body and the piston cap is directly applied to an electric parking brake type disc brake device, the following problem may occur.

That is, in a case where a rotary-to-linear motion conversion mechanism including a spindle as a rotary member and a nut as a linear motion member is used as the electric actuator, when the spindle is driven to rotate in a forward rotation direction to obtain a braking force of the parking brake, a slip may occur between the piston cap and the piston main body on which a torque is applied from a nut, and the piston main body may idle together with the nut. Therefore, it is difficult to stably obtain the braking force of the parking brake.

In order to solve the above problem, it is conceivable to couple the piston main body and the piston cap so as not to be rotatable relative to each other. By adopting such a configuration, when the spindle is driven to rotate in the forward rotation direction, it is possible to prevent idling of the piston main body and the nut, and it is possible to stably obtain the braking force of the parking brake.

However, when the spindle is driven to rotate in a reverse rotation direction to release the braking force of the parking brake, the nut is moved (fully released) to a limit position on a side opposite to a rotor, so that the nut and the spindle are brought into a locked state (that is, the nut cannot be further moved in an axial direction along with rotation of the spindle, and the nut is brought into a state of being forcibly rotated together with the spindle). When the nut and the spindle are brought into a locked state, an electric motor as a drive source may reach a stall torque (maximum current). That is, when the nut and the spindle are brought into a locked state, the torque acting on the piston main body from the nut rapidly increases, whereas the rotation of the piston main body is regulated by the piston cap and the piston main body does not rotate, and thus the spindle rapidly stops and the electric motor tends to reach the stall torque. Therefore, the durability of the electric motor tends to decrease. In addition, when a speed reduction mechanism such as a gear type speed reducer is provided between the electric motor and the spindle, a torque acting on the speed reduction mechanism excessively increases, and the durability of the speed reduction mechanism tends to decrease.

The present invention has been made to solve the above problems, and an object thereof is to provide an electric parking brake type disc brake device that can stably obtain a braking force of a parking brake while having a structure capable of preventing a temperature rise of brake oil, and can solve a problem caused when a linear motion member is fully released to a side opposite to a rotor.

Solution to Problem

A disc brake device according to the present invention includes a pad, a caliper, a piston, and a rotary-to-linear motion conversion mechanism.

The caliper includes a cylinder having an opening on a pad side.

The piston is fitted to the cylinder and configured to press the pad toward a rotor.

The rotary-to-linear motion conversion mechanism is configured to convert a rotary motion of a drive source into a linear motion to push the piston toward the rotor.

The disc brake device according to the present invention is configured to generate a braking force of a service brake by feeding brake oil into the cylinder, and is configured to generate a braking force of a parking brake by operating the rotary-to-linear motion conversion mechanism.

Further, in the disc brake device of the present invention, the piston is divided into two parts that are a piston main body and a piston cap in an axial direction.

The rotary-to-linear motion conversion mechanism includes: a rotary member configured to be driven to rotate by the drive source; and a linear motion member configured to be screwed to the rotary member, disposed inside the piston main body, engaged with the piston main body so as not to be rotatable relative to the piston main body, and configured to press the piston main body in the axial direction.

The disc brake device according to the present invention includes a unidirectional rotation regulating portion provided between the piston main body and the piston cap configured to regulate relative rotation of the piston main body in a forward rotation direction with respect to the piston cap when the rotary member is driven to rotate in the forward rotation direction to move the linear motion member to a rotor side, and configured to allow relative rotation of the piston main body in a reverse rotation direction with respect to the piston cap when the rotary member is driven to rotate in the reverse rotation direction to move the linear motion member to a side opposite to the rotor.

In the disc brake device according to a first aspect of the present invention, the unidirectional rotation regulating portion may include at least one (preferably, a plurality of) convex or concave main body-side engagement portion provided in the piston main body, and at least one (preferably, a plurality of) convex or concave cap-side engagement portion provided in the piston cap and mechanically engaged with the main body-side engagement portion when the rotary member is driven to rotate in the forward rotation direction.

The main body-side engagement portion may be formed integrally with other portions composing the piston main body, or may be formed separately from the other portions and fixed to the other portions.

The cap-side engagement portion may be formed integrally with other portions composing the piston cap, or may be formed separately from the other portions and fixed to the other portions.

In the disc brake device according to the aspect of the present invention, the piston main body may be made of metal, and the piston cap may be made of metal or synthetic resin.

In the disc brake device according to the aspect of the present invention, at least one of a portion of the main body-side engagement portion configured to come into contact with the cap-side engagement portion when the rotary member is driven to rotate in the forward rotation direction and a portion of the cap-side engagement portion configured to come into contact with the main body-side engagement portion when the rotary member is driven to rotate in the forward rotation direction may have a regulating surface parallel (or substantially parallel) to a central axis of the piston.

In the disc brake device according to the aspect of the present invention, the main body-side engagement portion may have a main body-side guide surface at a portion configured to come into contact with the cap-side engagement portion when the rotary member is driven to rotate in the reverse rotation direction, the main body-side guide surface being close to the rotor in the axial direction as the main body-side guide surface extends rearward in a reverse rotation direction, and the cap-side engagement portion may be configured to push up the main body-side guide surface when the rotary member is driven to rotate in the reverse rotation direction.

In this case, the main body-side guide surface may be an inclined surface or a curved surface (including a partially cylindrical surface and a partially spherical surface each having an arc-shaped cross section).

In the disc brake device according to the aspect of the present invention, the cap-side engagement portion may have a cap-side guide surface at a portion configured to come into contact with the main body-side engagement portion when the rotary member is driven to rotate in the reverse rotation direction, the cap-side guide surface being away from the rotor in the axial direction as the cap-side guide surface extends forward in the reverse rotation direction, and the cap-side guide surface may be configured to push up the main body-side engagement portion when the rotary member is driven to rotate in the reverse rotation direction.

In this case, the cap-side guide surface may be an inclined surface or a curved surface (including a partially cylindrical surface and a partially spherical surface each having an arc-shaped cross section).

In the disc brake device according to the aspect of the present invention, at least the cap-side engagement portion of the piston cap may be made of metal.

In this case, the piston cap may include a cap body made of synthetic resin and a metal engagement piece molded in the cap body, and a part of the engagement piece may compose the cap-side engagement portion.

In this case, the piston cap may further include the cap body made of synthetic resin, a metal engagement piece having a part (base portion) molded in the cap body, and a power transmitting member made of metal. The power transmitting member is exposed from an end surface of the cap body, and the exposed surface composes a cap-side transmission surface to be described later.

In the disc brake device according to the aspect of the present invention, a plurality of main body-side engagement portions may be provided so as to be spaced apart from each other in a circumferential direction, and a plurality of the cap-side engagement portions may be provided so as to be spaced apart from each other in the circumferential direction.

In this case, the plurality of main body-side engagement portions may be disposed at equal intervals in the circumferential direction, and the plurality of cap-side engagement portions may be disposed at equal intervals in the circumferential direction.

In the disc brake device according to the aspect of the present invention, the piston cap may be supported so as to be displaceable relative to the piston main body in the axial direction.

In this case, the piston cap may be supported so as to be displaceable relative to the piston main body in the axial direction at least as much as the main body-side engagement portion gets over the cap-side engagement portion when the rotary member is driven to rotate in the reverse rotation direction.

In the disc brake device according to the aspect of the present invention, an axial force transmitting portion configured to transmit an axial force between the piston main body and the piston cap may be further provided between the piston main body and the piston cap, and the axial force transmitting portion may be provided separately from the unidirectional rotation regulating portion.

In this case, the axial force transmitting portion may include a flat main body-side transmission surface of the piston main body located on a virtual plane orthogonal to a central axis of the piston main body and a flat cap-side transmission surface of the piston cap located on a virtual plane orthogonal to a central axis of the piston cap.

In the disc brake device according to a second aspect of the present invention, the unidirectional rotation regulating portion may be configured to transmit an axial force between the piston main body and the piston cap.

In this case, the unidirectional rotation regulating portion may include a main body-side sliding contact surface provided on the piston main body and a cap-side sliding contact surface provided on the piston cap and opposed to the main body-side sliding contact surface in the axial direction.

At least one of the main body-side sliding contact surface and the cap-side sliding contact surface may be subjected to surface processing for increasing a friction coefficient between the main body-side sliding contact surface and the cap-side sliding contact surface, or nay include a friction member.

When the rotary member is driven to rotate in a forward rotation direction, the main body-side sliding contact surface and the cap-side sliding contact surface may be frictionally engaged so as not to rotate relative to each other with an increase in an axial force acting on the cap-side sliding contact surface from the main body-side sliding contact surface.

When the rotary member is driven to rotate in a reverse rotation direction, the main body-side sliding contact surface may relatively rotate in the reverse rotation direction with respect to the cap-side sliding contact surface with a decrease in the axial force acting on the cap-side sliding contact surface from the main body-side sliding contact surface.

Advantageous Effects of Invention

According to the present invention, it is possible to implement an electric parking brake type disc brake device that can stably obtain a braking force of a parking brake while having a structure capable of preventing a temperature rise of brake oil, and can solve a problem caused when a linear motion member is fully released to a side opposite to a rotor.

BRIEF DESCRIPTION OF DRAWINGS

FIG. 6A shows a case where a spindle is driven to rotate in a forward rotation direction, and FIG. 6B shows a case where the spindle is driven to rotate in a reverse rotation direction;

FIG. 7A is a front view, and FIG. 7B is a perspective view;

FIG. 9A is a rear view, and FIG. 9B is a perspective view;

FIG. 11A shows a positional relationship between a main body-side engagement portion and a cap-side engagement portion when a spindle is driven to rotate in a forward rotation direction, and FIG. 11B shows a positional relationship between the main body-side engagement portion and the cap-side engagement portion when the spindle is driven to rotate in a reverse rotation direction;

DESCRIPTION OF EMBODIMENTS

First Example of Embodiment

Figure 1:
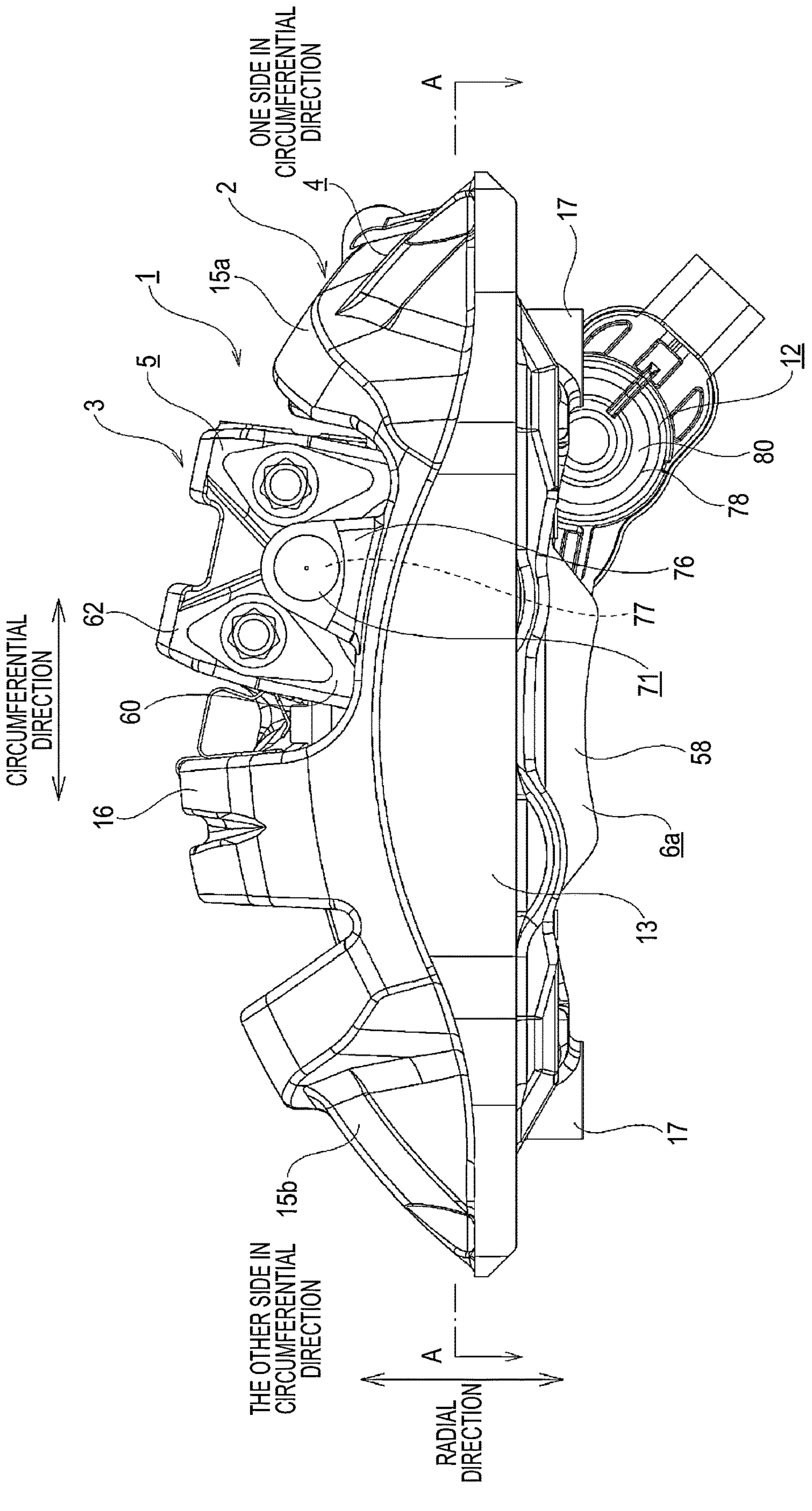
FIG. 1 is a front view showing a disc brake device according to a first example of an embodiment.

A first example of an embodiment will be described with reference to FIGS. 1 to 12.

<Overall Configuration of Disc Brake Device>

A disc brake device 1 of the present example is an electric parking brake type disc brake device, and has both a function of a hydraulic service brake and a function of an electric parking brake. The disc brake device 1 has a configuration in which an electric floating type brake mechanism 3 functioning as a parking brake is combined with a hydraulic opposed piston type brake mechanism 2 functioning as a service brake.

The disc brake device 1 includes an opposed piston type caliper 4 fixed to a suspension device such as a knuckle, a clamp member 5 supported so as to be displaceable in an axial direction with respect to the caliper 4, a pair of pads 6*a* and 6*b* (outer pad 6*a* and inner pad 6*b*), and a total of four pistons 7 and 8 (one dual-purpose piston 7 and three service-dedicated pistons 8).

In the present example, unless otherwise specified, an axial direction, a circumferential direction, and a radial direction refer to an axial direction, a circumferential direction, and a radial direction of a disc-shaped rotor 9 (see FIG. 2) that rotates together with a wheel. A front-back direction in FIG. 1, FIG. 7A, and FIG. 9A, an upper-lower direction in FIGS. 2 and 3, and a left-right direction in FIGS. 4 to 6B correspond to the axial direction. A central side of a vehicle body in an assembled state to the vehicle body is referred to as an axially inner side, and an outer side of the vehicle body in an assembled state to the vehicle body is referred to as an axially outer side. In addition, a left-right direction in FIGS. 1 to 3 and an upper-lower direction in FIG. 4 correspond to the circumferential direction. A right side in FIGS. 1 to 3 and an upper side in FIG. 4 are referred to as one side in the circumferential direction, and a left side in FIGS. 1 to 3 and a lower side in FIG. 4 are referred to as the other side in the circumferential direction. In the present example, the one side in the circumferential direction is a rotation-in side when a vehicle travels forward and a rotation-out side when the vehicle travels backward, and the other side in the circumferential direction is a rotation-out side when the vehicle travels forward and a rotation-in side when the vehicle travels backward. In addition, an upper-lower direction in FIG. 1 and a front-back direction in FIGS. 2 and 3 correspond to the radial direction. An upper side in FIG. 1 and a front side in FIGS. 2 and 3 are radially outer sides, and a lower side in FIG. 1 and a back side in FIGS. 2 and 3 are radially inner sides. The rotation-in side refers to a side on which the rotor 9 enters the caliper 4, and the rotation-out side refers to a side on which the rotor 9 exits from the caliper 4.

The disc brake device 1 obtains a braking force of the service brake by feeding brake oil (pressure oil), which is hydraulic oil, to all (four in the illustrated example) cylinders 10*a*, 10*b*, 11*a*, and 11*b* provided in the caliper 4 composing the opposed piston type brake mechanism 2. On the contrary, the disc brake device 1 obtains a braking force of the parking brake by driving an electric actuator 12 composing the floating type brake mechanism 3 without using the hydraulic oil and displacing the clamp member 5 relative to the caliper 4 in the axial direction. The opposed piston type brake mechanism 2 and the floating type brake mechanism 3 use the pair of pads 6*a* and 6*b* and one dual-purpose piston 7 in common.

<Opposed Piston Type Brake Mechanism>

Figure 2:
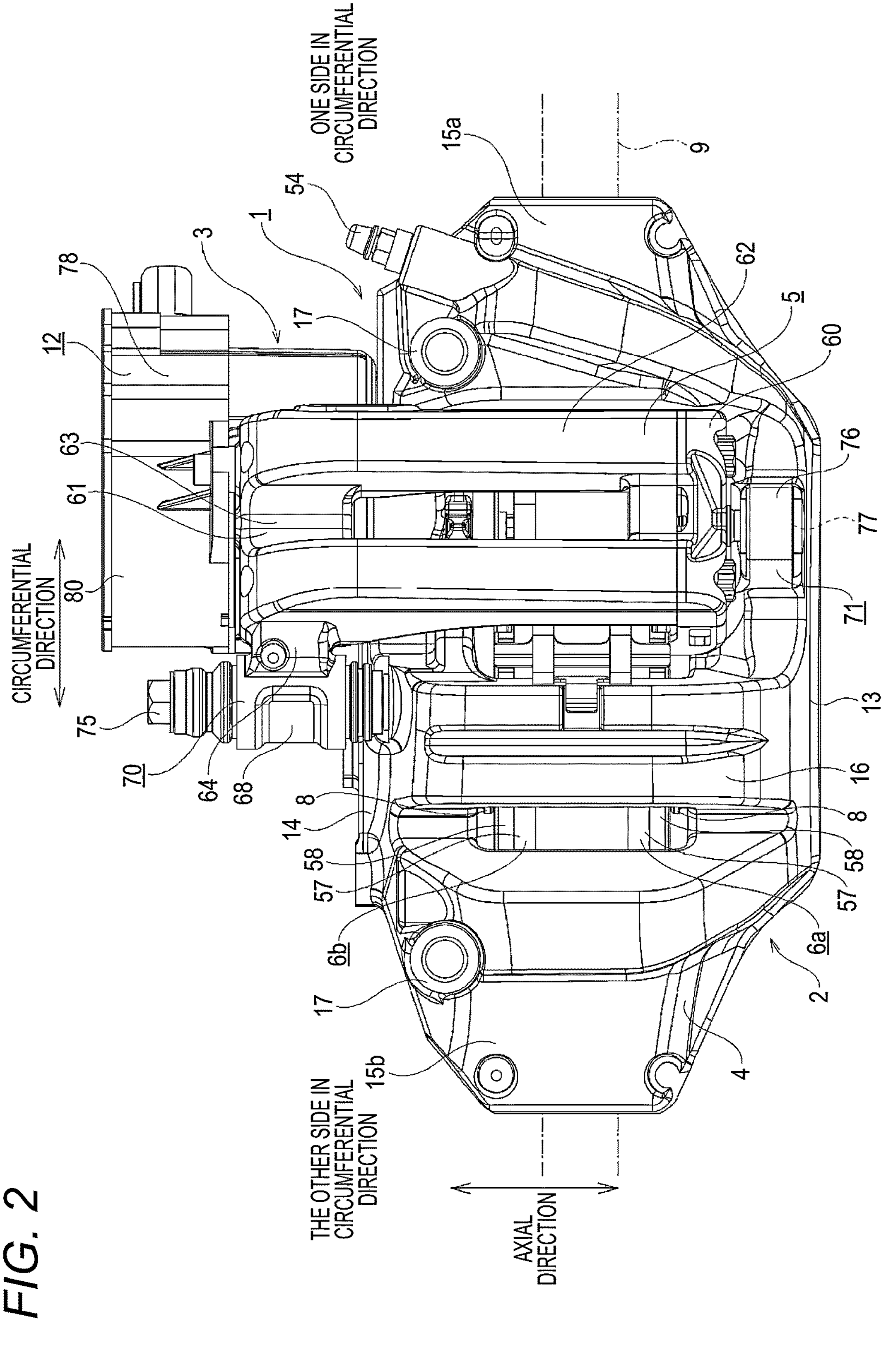
FIG. 2 is a plan view showing the disc brake device according to the first example of the embodiment.
Figure 3:
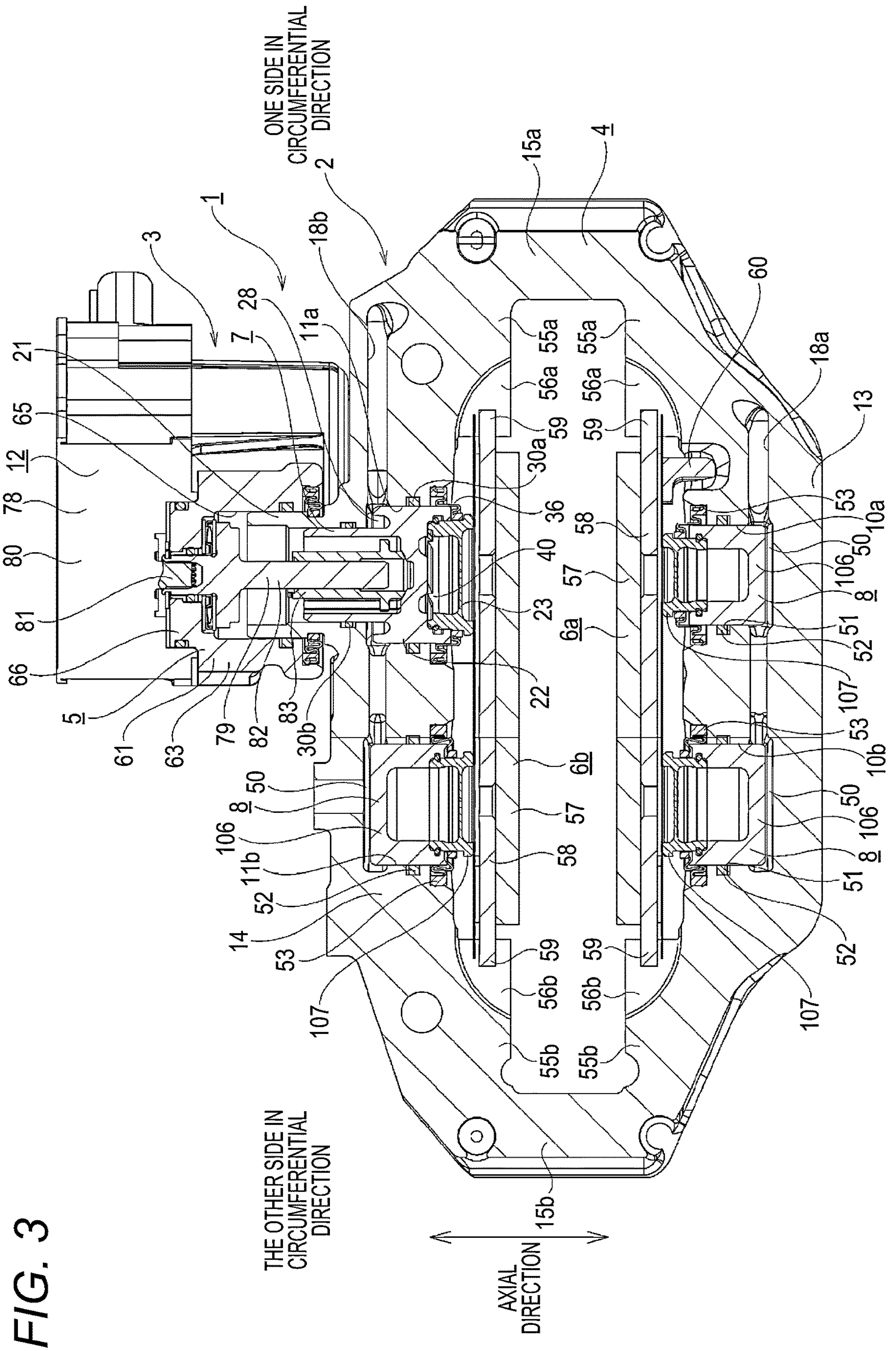
FIG. 3 is a cross-sectional view taken along a line A-A in FIG. 1.
Figure 4:
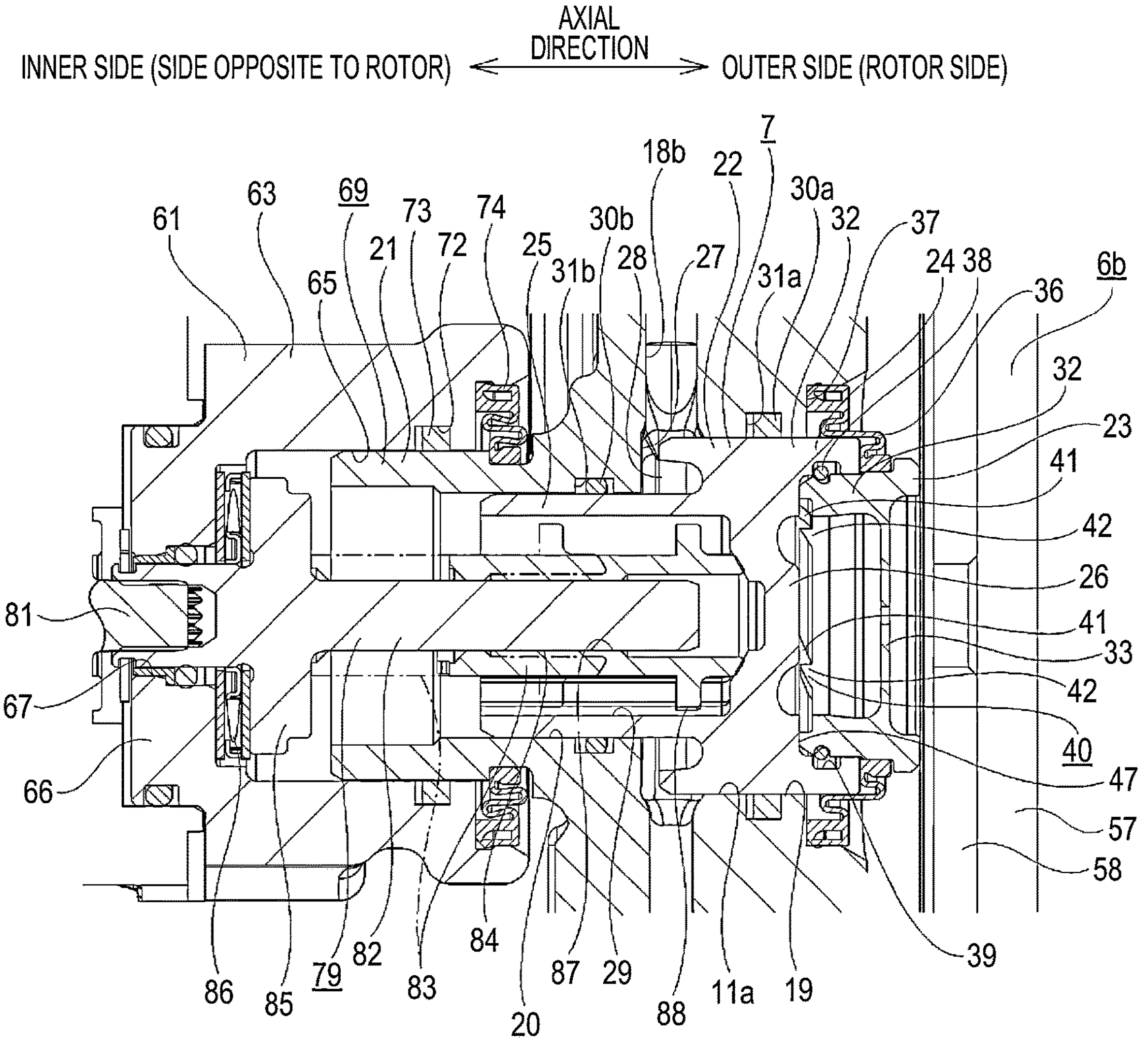
FIG. 4 is a partially enlarged view of FIG. 3.

The caliper 4 composing the opposed piston type brake mechanism 2 supports the outer pad 6*a* and the inner pad 6*b* such that the outer pad 6*a* and the inner pad 6*b* are movable in the axial direction (front-back direction in FIG. 1 and the upper-lower direction in FIGS. 2 and 3). The caliper 4 is a cast product (including a die-cast molded product) of a light alloy such as an aluminum alloy, and includes an outer body portion 13 and an inner body portion 14 that are disposed on both sides of the rotor 9 in the axial direction, and coupling portions 15*a*, 15*b*, and 16 that are disposed on a radially outer side of the rotor 9. The caliper 4 is supported and fixed to the suspension device by a pair of attachment seats 17 included in the inner body portion 14.

The rotation-in side coupling portion 15*a* is disposed on one side in the circumferential direction of the caliper 4 (right side in FIGS. 1 to 3 and rotation-in side when a vehicle travels forward) and on the radially outer side of the rotor 9, and couples one side portion in the circumferential direction of the outer body portion 13 and one side portion in the circumferential direction of the inner body portion 14 in the axial direction. The rotation-out side coupling portion 15*b* is disposed on the other side in the circumferential direction of the caliper 4 (left side in FIGS. 1 to 3 and rotation-out side when a vehicle travels forward) and on the radially outer side of the rotor 9, and couples the other side portion in the circumferential direction of the outer body portion 13 and the other side portion in the circumferential direction of the inner body portion 14 in the axial direction. An intermediate coupling portion 16 is disposed in a circumferentially intermediate portion of the caliper 4 and on the radially outer side of the rotor 9, and couples a circumferentially intermediate portion of the outer body portion 13 and a circumferentially intermediate portion of the inner body portion 14 in the axial direction.

The outer body portion 13 is disposed axially outside the rotor 9, and has a rotation-in side outer cylinder 10*a* on the one side in the circumferential direction and a rotation-out side outer cylinder 10*b* on the other side in the circumferential direction. The inner body portion 14 is disposed axially inside the rotor 9, and includes a rotation-in side inner cylinder 11*a* on the one side in the circumferential direction and a rotation-out side inner cylinder 11*b* on the other side in the circumferential direction. The rotation-in side outer cylinder 10*a* and the rotation-in side inner cylinder 11*a* are coaxially disposed so as to face each other in the axial direction, and the rotation-out side outer cylinder 10*b* and the rotation-out side inner cylinder 11*b* are coaxially disposed so as to face each other in the axial direction.

The outer body portion 13 and the inner body portion 14 include oil passages 18*a* and 18*b*, respectively. The oil passage 18*a* provided inside the outer body portion 13 extends in the circumferential direction, and allows the rotation-in side outer cylinder 10*a* and the rotation-out side outer cylinder 10*b* to communicate with each other. The oil passage 18*b* provided inside the inner body portion 14 extends in the circumferential direction, and allows the rotation-in side inner cylinder 11*a* and the rotation-out side inner cylinder 11*b* to communicate with each other. The two oil passages 18*a* and 18*b* communicate with each other.

Among the four cylinders 10*a*, 10*b*, 11*a*, and 11*b* in total, the dual-purpose piston 7 used for both the service brake and the parking brake is fitted inside the rotation-in side inner cylinder 11*a* so as to be displaceable in the axial direction. The service-dedicated piston 8 used only for the service brake is fitted inside the remaining three cylinders 10*a*, 10*b*, and 11*b* other than the rotation-in side inner cylinder 11*a* so as to be displaceable in the axial direction.

The rotation-in side inner cylinder 11*a* corresponds to a cylinder described in the claims, and is opened not only to an axially outer surface of the inner body portion 14 but also to an axially inner surface of the inner body portion 14, as shown in FIGS. 3 and 4. That is, the rotation-in side inner cylinder 11*a* is formed so as to pass through the inner body portion 14 in the axial direction. The rotation-in side inner cylinder 11*a* is a stepped hole, and has a large diameter hole portion 19 in an axially outer half portion and a small diameter hole portion 20 in an axially inner half portion.

A guide cylinder 21 is provided at an opening edge portion of the small diameter hole portion 20. The guide cylinder 21 extends axially inward from the opening edge portion of the small diameter hole portion 20 of the rotation-in side inner cylinder 11*a*, and is disposed coaxially with the rotation-in side inner cylinder 11*a*. The guide cylinder 21 has a cylindrical shape and has the same inner diameter as the small diameter hole portion 20. A length dimension of the guide cylinder 21 in the axial direction is larger than a displacement amount of the clamp member 5 that is displaced in the axial direction when the parking brake is operated.

<Dual-Purpose Piston>

The dual-purpose piston 7 fitted to the rotation-in side inner cylinder 11*a* corresponds to the piston described in the claims, and has a divided structure divided into two parts in the axial direction. The dual-purpose piston 7 includes a piston main body 22 and a piston cap 23.

The piston main body 22 is made of carbon steel such as S10C or S45C, has a bottomed cylindrical shape, and is fitted to the rotation-in side inner cylinder 11*a*. The piston main body 22 includes a large diameter cylindrical portion 24 disposed on an axially outer portion and fitted to the large diameter hole portion 19, and a small diameter cylindrical portion 25 disposed on an axially inner portion and fitted to the small diameter hole portion 20.

The large diameter cylindrical portion 24 includes a partition wall portion 26 having a substantially disc shape. The partition wall portion 26 is disposed in an axially intermediate portion of the large diameter cylindrical portion 24, and partitions (blocks) the inside of the large diameter cylindrical portion 24 in the axial direction. As shown in FIG. 4, an axially inner end surface of the large diameter cylindrical portion 24 and a radially outer portion of an axially inner surface of the partition wall portion 26 face a bottom surface 27 of the large diameter hole portion 19 of the rotation-in side inner cylinder 11*a* in the axial direction. An annular hydraulic chamber 28 for introducing brake oil is formed between the axially inner end surface of the large diameter cylindrical portion 24, the radially outer portion of the axially inner surface of the partition wall portion 26, and the bottom surface 27 of the large diameter hole portion 19 of the rotation-in side inner cylinder 11*a*. The hydraulic chamber 28 communicates with the oil passage 18*b*.

The small diameter cylindrical portion 25 extends axially inward from a radially intermediate portion of the axially inner surface of the partition wall portion 26, and is disposed coaxially with the large diameter cylindrical portion 24. A female spline 29 is provided on an inner peripheral surface of the small diameter cylindrical portion 25.

A portion between the large diameter cylindrical portion 24 and the large diameter hole portion 19 and a portion between the small diameter cylindrical portion 25 and the small diameter hole portion 20 are sealed by annular piston seals 30*a* and 30*b*, respectively. The piston seal 30*a* is mounted in a seal groove 31*a* formed in an inner peripheral surface of an axially intermediate portion of the large diameter hole portion 19. The piston seal 30*b* is mounted in a seal groove 31*b* formed in an inner peripheral surface of an axially intermediate portion of the small diameter hole portion 20.

Figure 5:
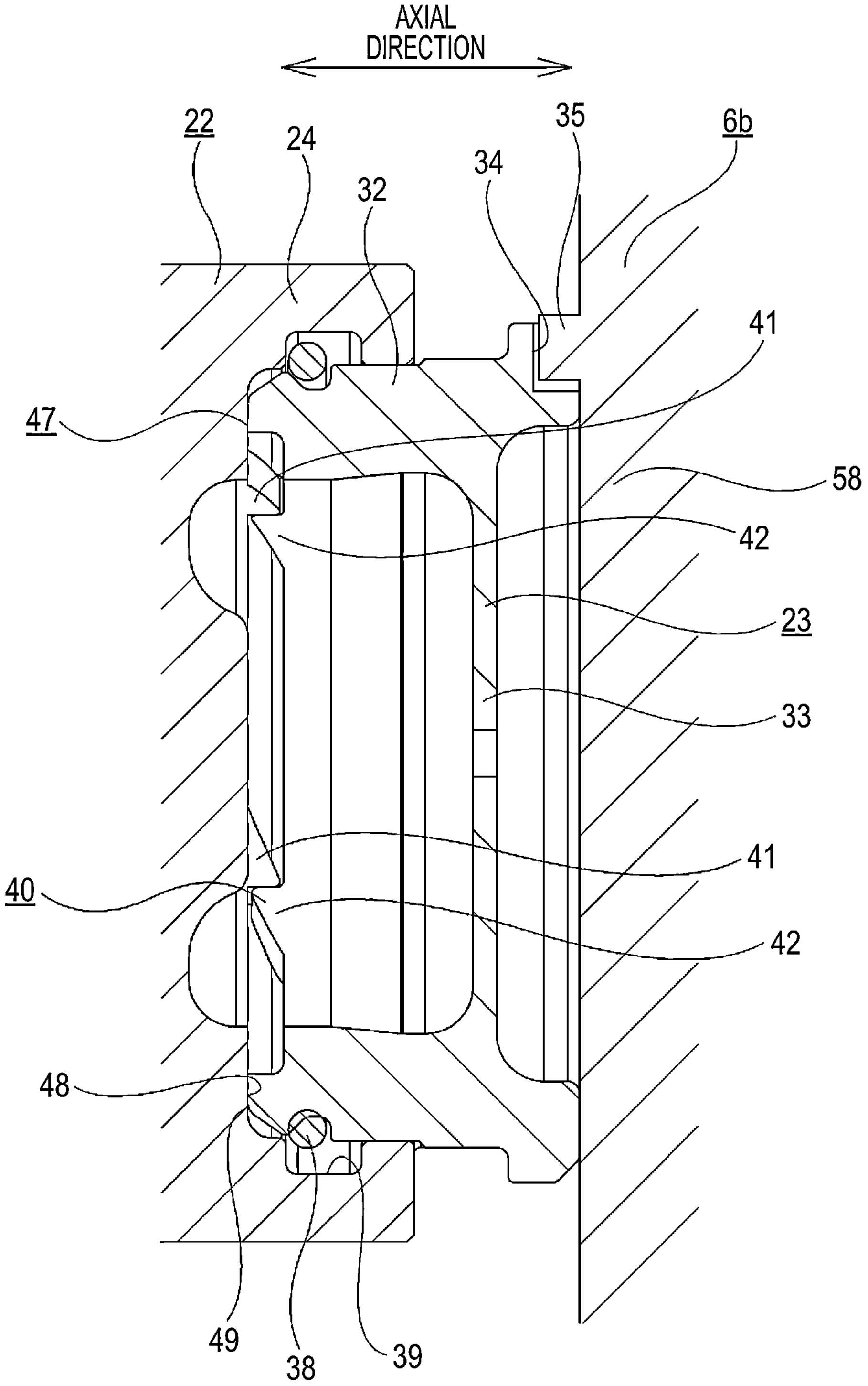
FIG. 5 is a schematic cross-sectional view showing an example of a detent structure of a piston cap with respect to an inner pad in the first example of the embodiment.
Figure 6A:
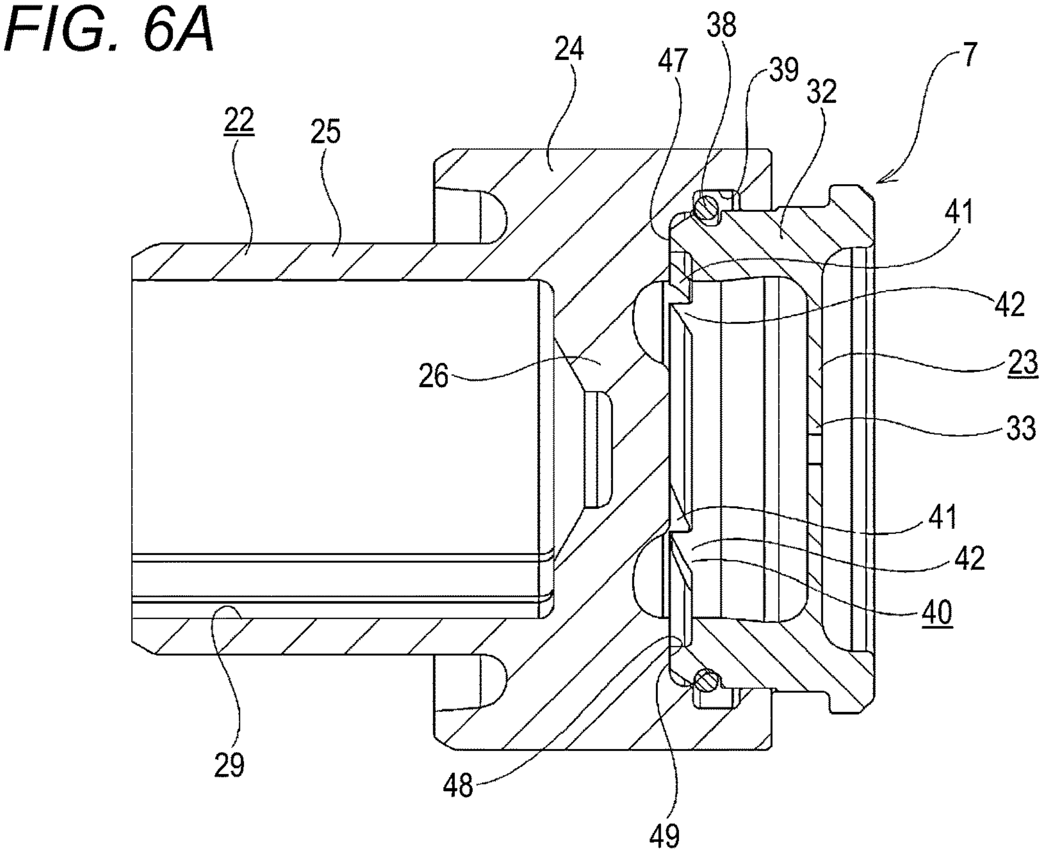
FIGS. 6A and 6B are cross-sectional views showing a dual-purpose piston taken out in the first example of the embodiment.
Figure 6B:
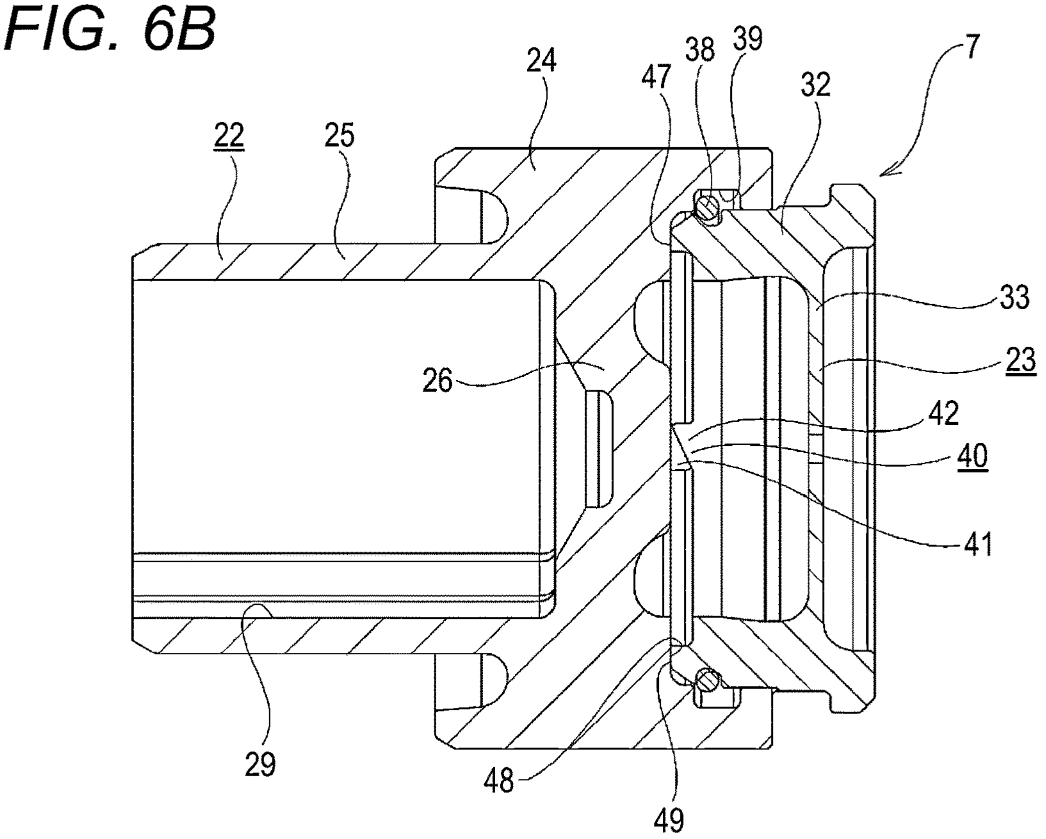

The piston cap 23 is made of, for example, stainless steel, titanium, or synthetic resin, includes a cylindrical portion 32 and a closing plate portion 33, and is formed in a bottomed cylindrical shape. In the piston cap 23, an axially inner portion of the cylindrical portion 32 is disposed inside the large diameter cylindrical portion 24, and an axially outer portion of the cylindrical portion 32 is prevented from rotating with respect to the inner pad 6*b*. Specifically, as shown in FIG. 5, the piston cap 23 is regulated from rotating relative to the inner pad 6*b* by engaging an engagement protrusion (dowel) 35 provided on (back plate 58 of) the inner pad 6*b* with an engagement recess 34 provided on an axially outer end surface of the cylindrical portion 32.

In the case of implementing the present invention, a detent structure between the piston cap and the inner pad can be omitted, and the relative rotation of the piston cap with respect to the inner pad can be regulated by utilizing a frictional force acting between the piston cap and the inner pad.

A piston boot 36 is bridged between the cylindrical portion 32 of the piston cap 23 and an axially outer opening edge portion of the large diameter hole portion 19 of the rotation-in side inner cylinder 11*a*. A radially outer portion of the piston boot 36 is mounted in an annular recessed groove 37 provided in the axially outer opening edge portion of the large diameter hole portion 19, and a radially inner portion of the piston boot 36 is externally fitted to an axially intermediate portion of the cylindrical portion 32.

A piston ring 38 having a C-shape as a whole is externally fitted to a portion of the cylindrical portion 32 of the piston cap 23 disposed inside the large diameter cylindrical portion 24 of the piston main body 22. The piston ring 38 has a circular cross-sectional shape. A radially outer portion of the piston ring 38 is engaged with a holding recessed groove 39 having a substantially rectangular cross-sectional shape and provided on an inner peripheral surface of the large diameter cylindrical portion 24 so as to be displaceable in the axial direction. Accordingly, the piston cap 23 is held so as to be displaceable relative to the piston main body 22 in the axial direction. In the case of implementing the present invention, the piston ring may be fitted to the inner peripheral surface of the large diameter cylindrical portion, and the radially inner portion of the piston ring may be engaged with the holding recessed groove formed in the outer peripheral surface of the piston cap so as to be displaceable in the axial direction. In a state in which the piston cap 23 is held with respect to the piston main body 22, a central axis $O_{23}$ (see FIG. 9A) of the piston cap 23 and a central axis $O_{22}$ (see FIG. 7A) of the piston main body 22 are disposed coaxially with each other. The central axis of the piston cap 23 and the central axis of the piston main body 22, which are disposed coaxially with each other, are also referred to as a central axis of the dual-purpose piston 7.

<Unidirectional Rotation Regulating Portion>

In the present example, a unidirectional rotation regulating portion 40 is disposed between the piston main body 22 and the piston cap 23. The piston main body 22 and the piston cap 23 are connected to each other via the unidirectional rotation regulating portion 40 without being coupled to each other by fitting the piston main body 22 and the piston cap 23 in an uneven manner or without being coupled to each other so as not to be relatively rotatable in any direction as in the conventional structure described above.

The unidirectional rotation regulating portion 40 has a function like a unidirectional clutch, and regulates (blocks) the relative rotation of the piston main body 22 with respect to the piston cap 23 in the forward rotation direction (arrow X direction in FIGS. 7A, 11A, 11B, 12A, and 12B), but allows the relative rotation in the reverse rotation direction (arrow Y direction in FIGS. 7A, 11A, 11B, 12A, and 12B). That is, as described later, when a spindle 82 of a rotary-to-linear motion conversion mechanism 79 composing the electric actuator 12 is driven to rotate in the forward rotation direction (during applying) to obtain the braking force of the parking brake, the unidirectional rotation regulating portion 40 regulates the relative rotation of the piston main body 22 with respect to the piston cap 23 in the forward rotation direction. On the contrary, when the spindle 82 is driven to rotate in the reverse rotation direction (during release) to release the braking force of the parking brake, the unidirectional rotation regulating portion 40 allows the relative rotation of the piston main body 22 with respect to the piston cap 23 in the reverse rotation direction.

In order to exhibit the above function, the unidirectional rotation regulating portion includes a main body-side engagement portion 41 in the piston main body 22, and includes a cap-side engagement portion 42 in the piston cap 23. The main body-side engagement portion 41 and the cap-side engagement portion 42 are mechanically (unreleasably) engaged with each other when the spindle 82 is driven to rotate in the forward rotation direction.

Figure 7A:
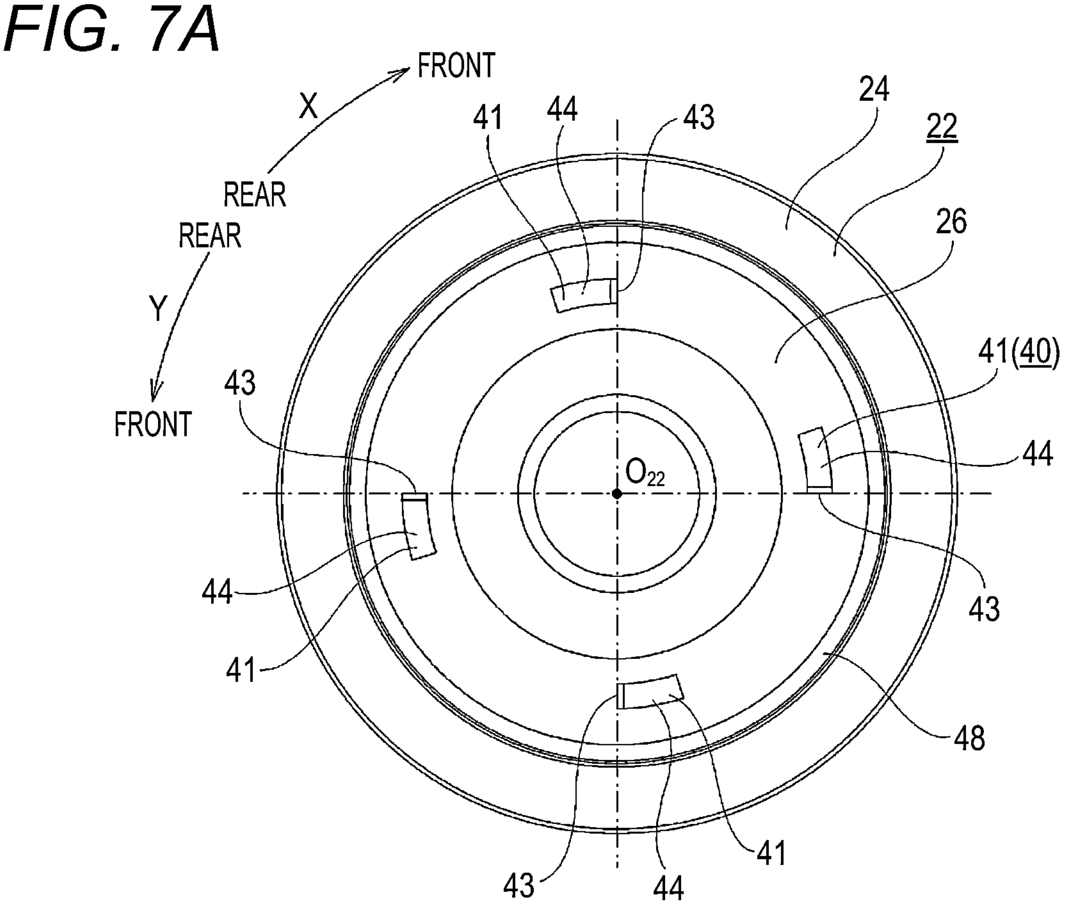
FIGS. 7A and 7B show piston main body taken out in the first example of the embodiment.
Figure 7B:
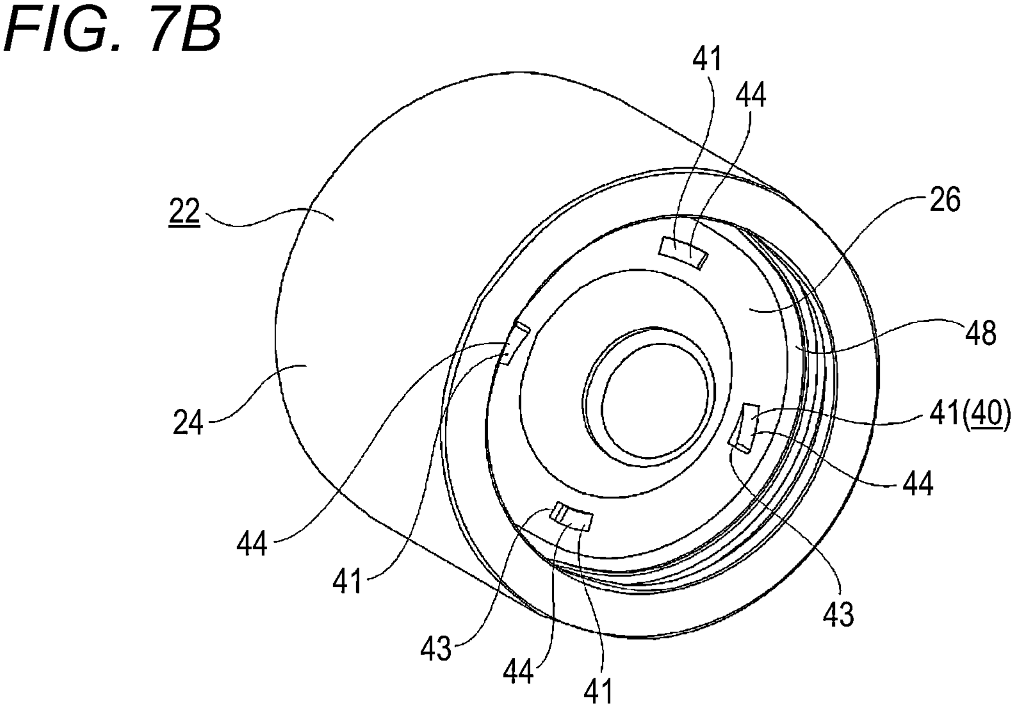
Figure 8:
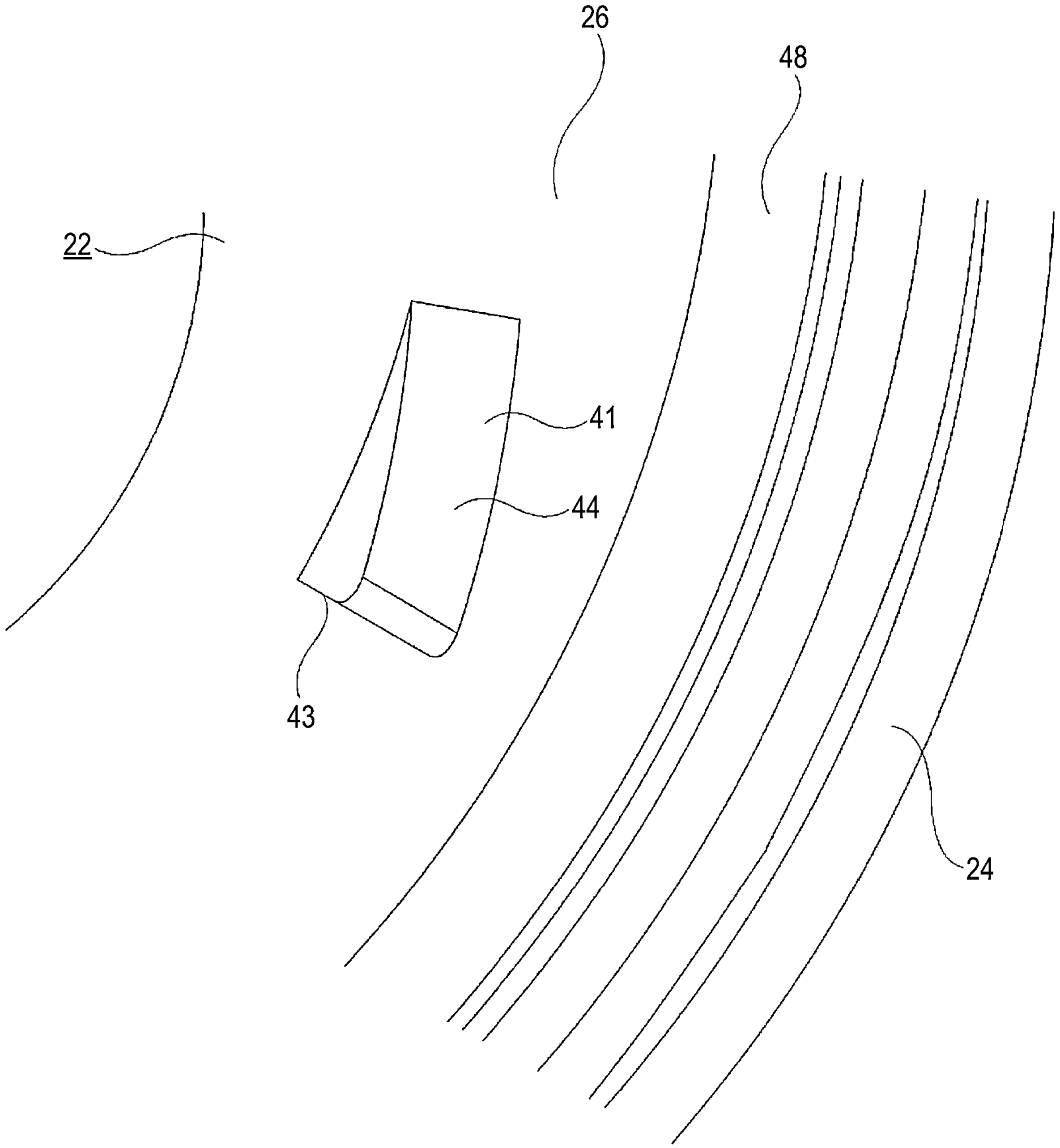
FIG. 8 is a partially enlarged view of (B) of FIG. 7.

The main body-side engagement portion 41 is provided on an axially outer surface of the partition wall portion 26 of the piston main body 22. As shown in FIGS. 7A, 7B, and 8, the main body-side engagement portion 41 has a convex shape protruding in the axial direction, and a plurality of (four in the illustrated example) main body-side engagement portions 41 are provided on the radially outer portion of the axially outer surface of the partition wall portion 26 at equal intervals in the circumferential direction. The plurality of main body-side engagement portions 41 are disposed on a concentric circle centered on the central axis $O_{22}$ of the piston main body 22.

Each of the main body-side engagement portions 41 has a substantially triangular prism shape, and has a substantially fan shape as viewed in the axial direction and a triangular shape as viewed in the radial direction. Therefore, each of the main body-side engagement portions 41 has an axial height from the axially outer surface of the partition wall portion 26 that varies in the circumferential direction. Specifically, each of the main body-side engagement portions 41 has a shape in which the axial height gradually increases from the rear to the front in the forward rotation direction (arrow X direction in FIG. 7A) (from the front to the rear in the reverse rotation direction (arrow Y direction in FIG. 7A)). Therefore, in the main body-side engagement portion 41, an axial height of an end portion on the front side in the forward rotation direction is the largest, and an axial height of an end portion on the rear side in the forward rotation direction is the smallest.

As shown in FIG. 8, each of the main body-side engagement portions 41 has a main body-side regulating surface 43 on a side surface on the front side in the forward rotation direction. The main body-side regulating surface 43 is formed in a flat surface shape, and is disposed parallel to the central axis $O_{22}$ of the piston main body 22. That is, the main body-side regulating surface 43 is a right angle surface perpendicular to the axially outer surface of the partition wall portion 26. In the present example, the main body-side regulating surface 43 is disposed on a virtual plane including the central axis $O_{22}$ of the piston main body 22. When the spindle 82 is driven to rotate in the forward rotation direction, the main body-side regulating surface 43 comes into surface contact with a cap-side regulating surface 45 to be described later which is provided in the cap-side engagement portion 42.

As shown in FIG. 8, each of the main body-side engagement portions 41 has a main body-side guide surface 44 on an axially distal end surface thereof. The main body-side guide surface 44 is formed in a flat surface shape, and is an inclined surface linearly inclined in a direction in which the main body-side guide surface 44 is close to the rotor 9 as the main body-side guide surface 44 extends rearward from the front in the reverse rotation direction. That is, the main body-side guide surface 44 is an inclined surface inclined with respect to the axially outer surface of the partition wall portion 26. An inclination angle $\alpha$ (see FIG. 12A) with respect to the axially outer surface of the partition wall portion 26 is preferably set in a range of 10 degrees to 70 degrees, and more preferably set in a range of 25 degrees to 55 degrees. When the spindle 82 is driven to rotate in the reverse rotation direction, the main body-side guide surface 44 comes into contact with a cap-side guide surface 46 to be described later which is provided on the cap-side engagement portion 42. The main body-side guide surface 44 and the main body-side regulating surface 43 are connected to each other via a chamfered portion.

Figure 9A:
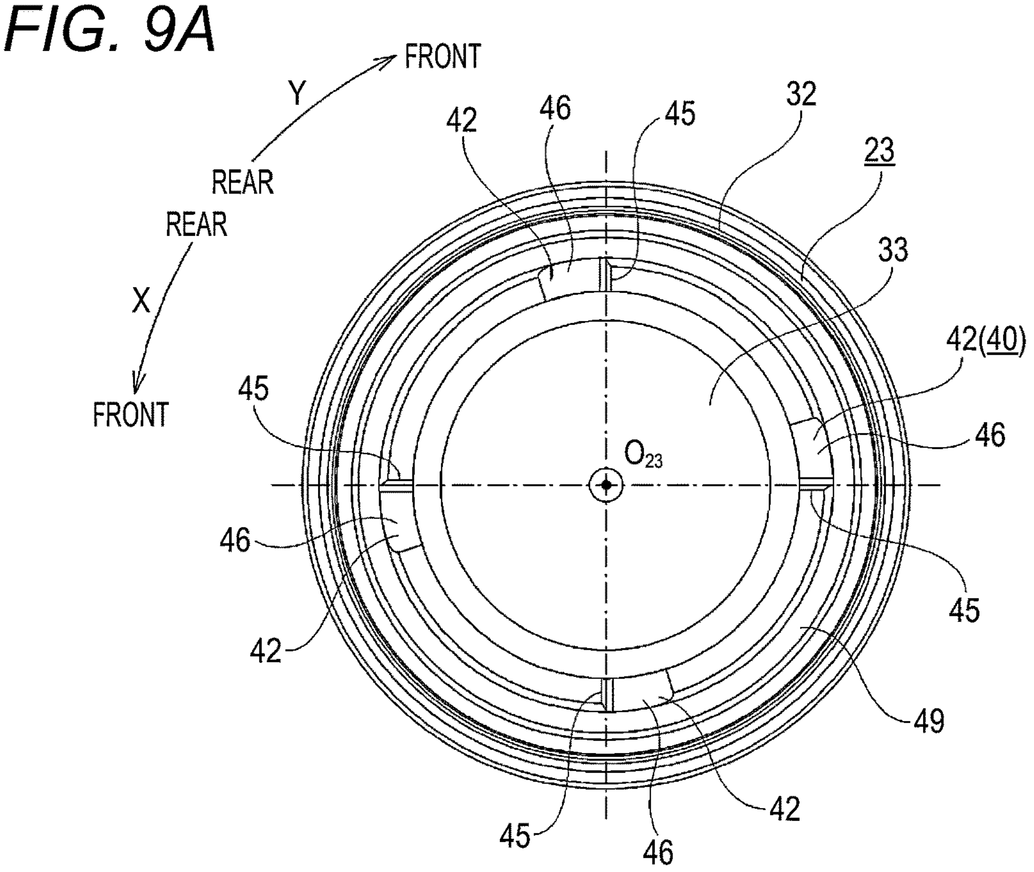
FIGS. 9A and 9B show piston cap taken out in the first example of the embodiment.
Figure 9B:
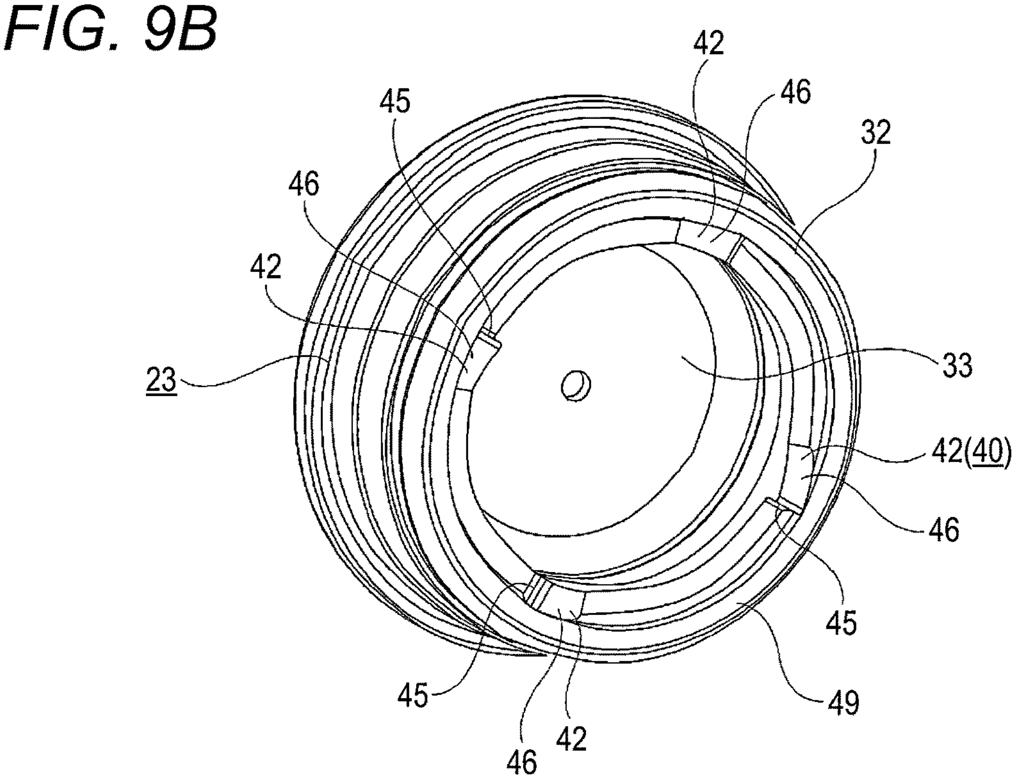
Figure 10:
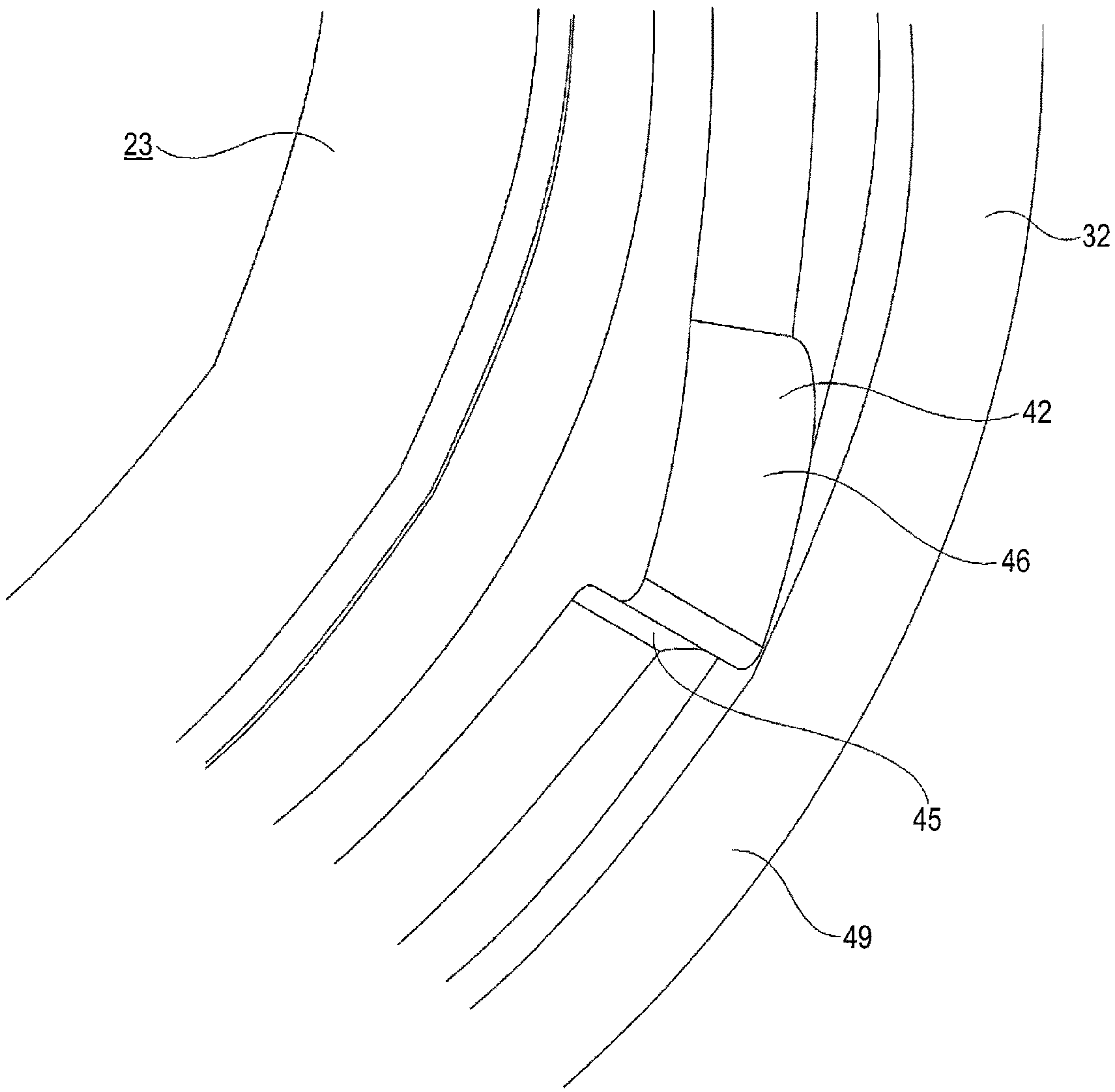
FIG. 10 is a partially enlarged view of FIG. 9B.

The cap-side engagement portion 42 is provided on an axially inner end surface of the cylindrical portion 32 of the piston cap 23. As shown in FIGS. 9A, 9B, and 10, the cap-side engagement portion 42 has a convex shape protruding in the axial direction, and a plurality of (four in the illustrated example) cap-side engagement portions 42 are provided on the axially inner end surface of the cylindrical portion 32 at equal intervals in the circumferential direction. The plurality of cap-side engagement portions 42 are disposed on a concentric circle centered on the central axis $O_{23}$ of the piston cap 23.

Each of the cap-side engagement portions 42 has substantially the same shape as each of the main body-side engagement portions 41. That is, each of the cap-side engagement portions 42 has a substantially triangular prism shape, and has a substantially fan shape as viewed in the axial direction and a triangular shape as viewed in the radial direction. Therefore, each of the cap-side engagement portions 42 has an axial height from the axially inner end surface of the cylindrical portion 32 that varies in the circumferential direction. Specifically, each of the cap-side engagement portions 42 has a shape in which the axial height gradually increases from the rear to the front in the reverse rotation direction (arrow Y direction in FIG. 9A) (from the front to the rear in the forward rotation direction (arrow X direction in FIG. 9A)). Therefore, in the cap-side engagement portion 42, an axial height of an end portion on the front side in the reverse rotation direction is the largest, and an axial height of an end portion on the rear side in the reverse rotation direction is the smallest.

As shown in FIG. 10, each of the cap-side engagement portions 42 has a cap-side regulating surface 45 on a side surface on the rear side in the forward rotation direction. The cap-side regulating surface 45 is formed in a flat surface shape, and is disposed parallel to the central axis $O_{23}$ of the piston cap 23. That is, the cap-side regulating surface 45 is a right angle surface perpendicular to the axially inner end surface of the cylindrical portion 32. In the present example, the cap-side regulating surface 45 is disposed on a virtual plane including the central axis $O_{23}$ of the piston cap 23. When the spindle 82 is driven to rotate in the forward rotation direction, the cap-side regulating surface 45 comes into surface contact with the main body-side regulating surface 43 provided in the main body-side engagement portion 41.

As shown in FIG. 10, each of the cap-side engagement portions 42 has a cap-side guide surface 46 on an axially distal end surface thereof. The cap-side guide surface 46 is formed in a flat surface shape, and is an inclined surface linearly inclined in a direction in which the cap-side guide surface 46 is away from the rotor 9 as the cap-side guide surface 46 extends forward from the rear in the reverse rotation direction. That is, the cap-side guide surface 46 is an inclined surface inclined with respect to the axially inner end surface of the cylindrical portion 32. An inclination angle R (see FIG. 12A) with respect to the axially inner end surface of the cylindrical portion 32 is preferably set in a range of 10 degrees to 70 degrees, and more preferably set in a range of 25 degrees to 55 degrees. In the present example, the inclination angle R of the cap-side guide surface 46 is the same as the inclination angle $\alpha$ of the main body-side guide surface 44. However, the inclination angle R may be different from the inclination angle $\alpha$. When the spindle 82 is driven to rotate in the reverse rotation direction, the cap-side guide surface 46 comes into contact with the main body-side guide surface 44 provided in the main body-side engagement portion 41. The cap-side guide surface 46 and the cap-side regulating surface 45 are connected to each other via a chamfered portion.

The inclination angle $\alpha$ of the main body-side guide surface 44 and the inclination angle $\beta$ of the cap-side guide surface 46 can be determined in consideration of the fact that the frictional force acting on the piston main body 22 by the piston seals 30*a* and 30*b* is overcome and the main body-side guide surface 44 rides on the cap-side guide surface 46, and the fact that the main body-side guide surface 44 slips down from the cap-side guide surface 46 during forward rotation driving.

Figure 11A:
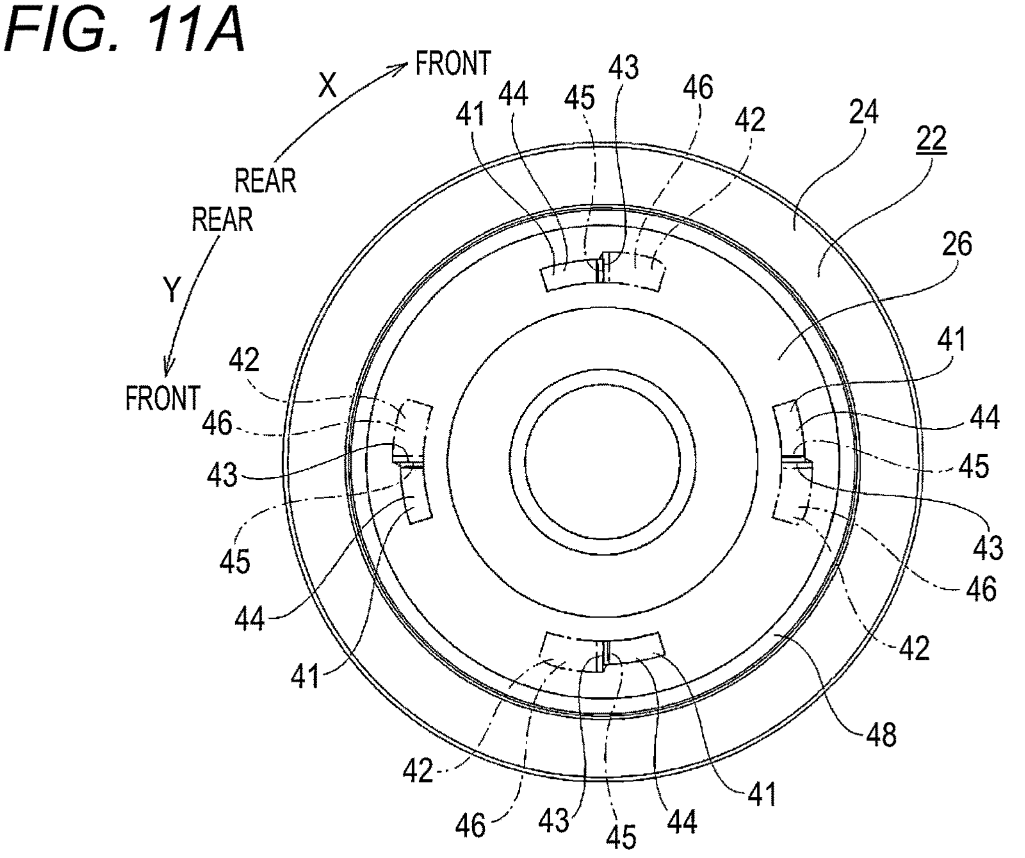
FIGS. 11A and 11B are front view of the piston main body for explaining a function of a unidirectional rotation regulating portion in the first example of the embodiment.
Figure 12A:
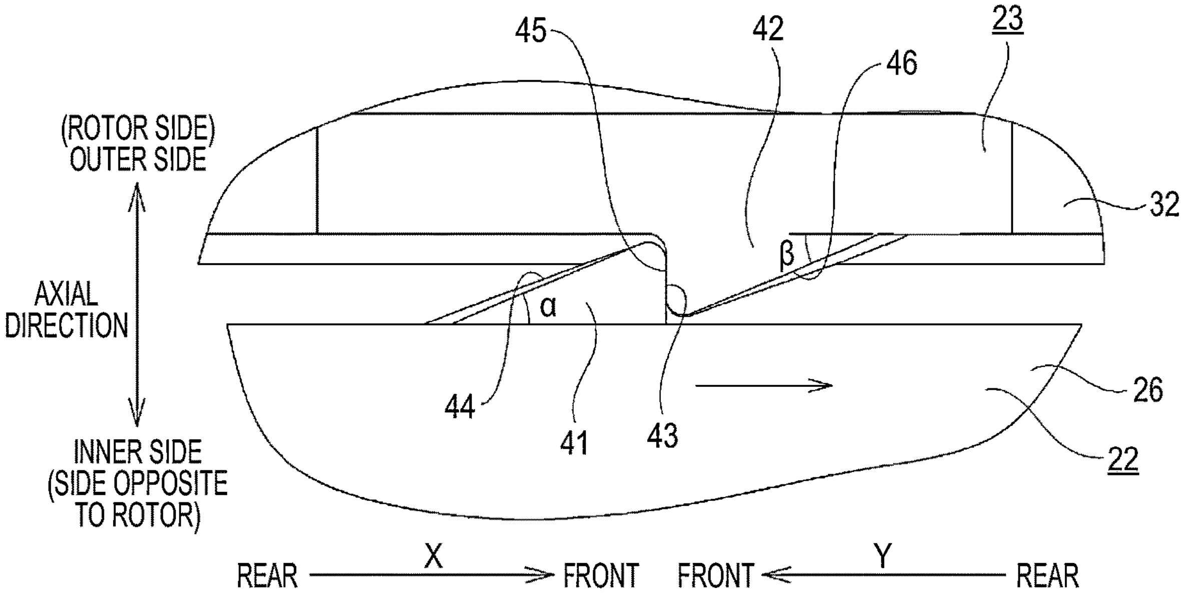
FIG. 12A is a partially enlarged view of FIG. 6A.

As shown in FIG. 11A and FIG. 12A, when the spindle 82 is driven to rotate in the forward rotation direction, the main body-side regulating surfaces 43, which are right angle surfaces, simultaneously come into surface contact with the cap-side regulating surfaces 45, which are right angle surfaces, and the main body-side engagement portions 41 and the cap-side engagement portions 42 are mechanically engaged with each other. Here, the piston cap 23 including the cap-side engagement portion 42 is prevented from rotating with respect to the inner pad 6*b*, and cannot rotate about the central axis $O_{23}$ thereof. Therefore, when the spindle 82 is driven to rotate in the forward rotation direction, the relative rotation of the piston main body 22 with respect to the piston cap 23 in the forward rotation direction is regulated.

Figure 11B:
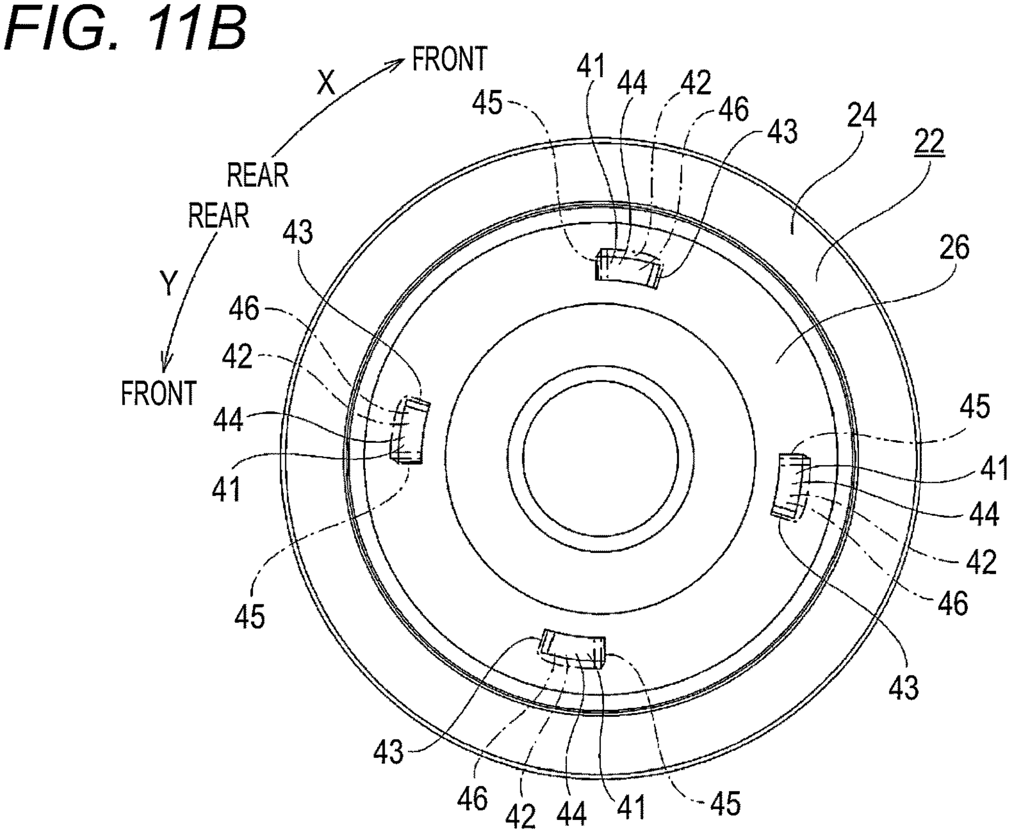
Figure 12B:
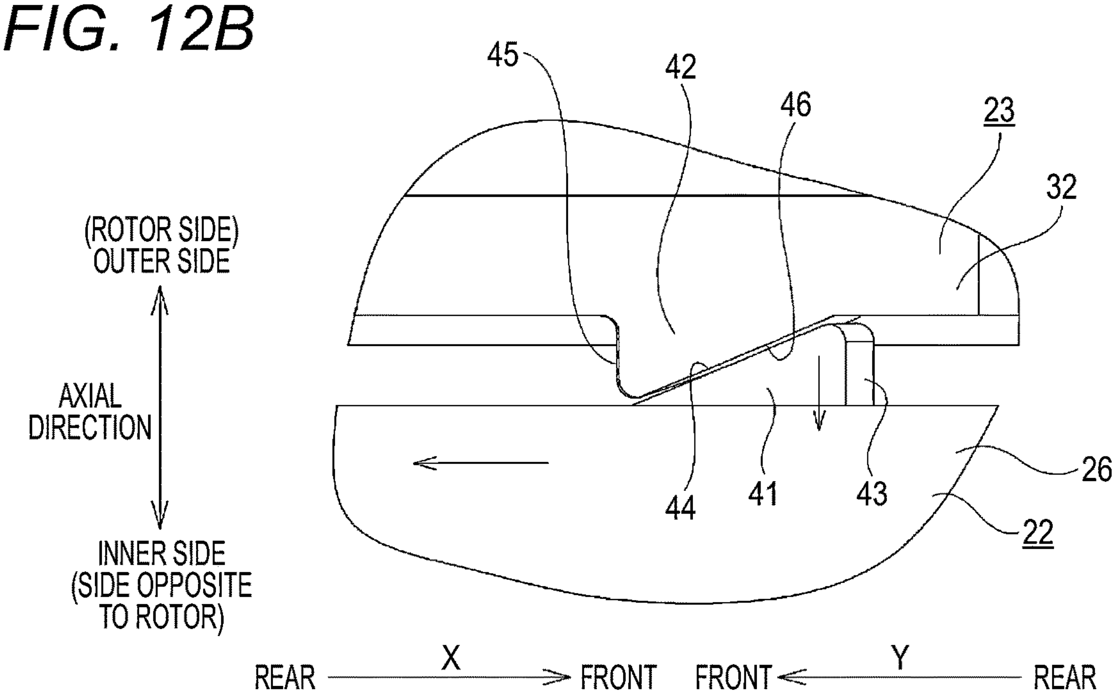
FIG. 12B is a partially enlarged view of FIG. 6B.
Figure 13:
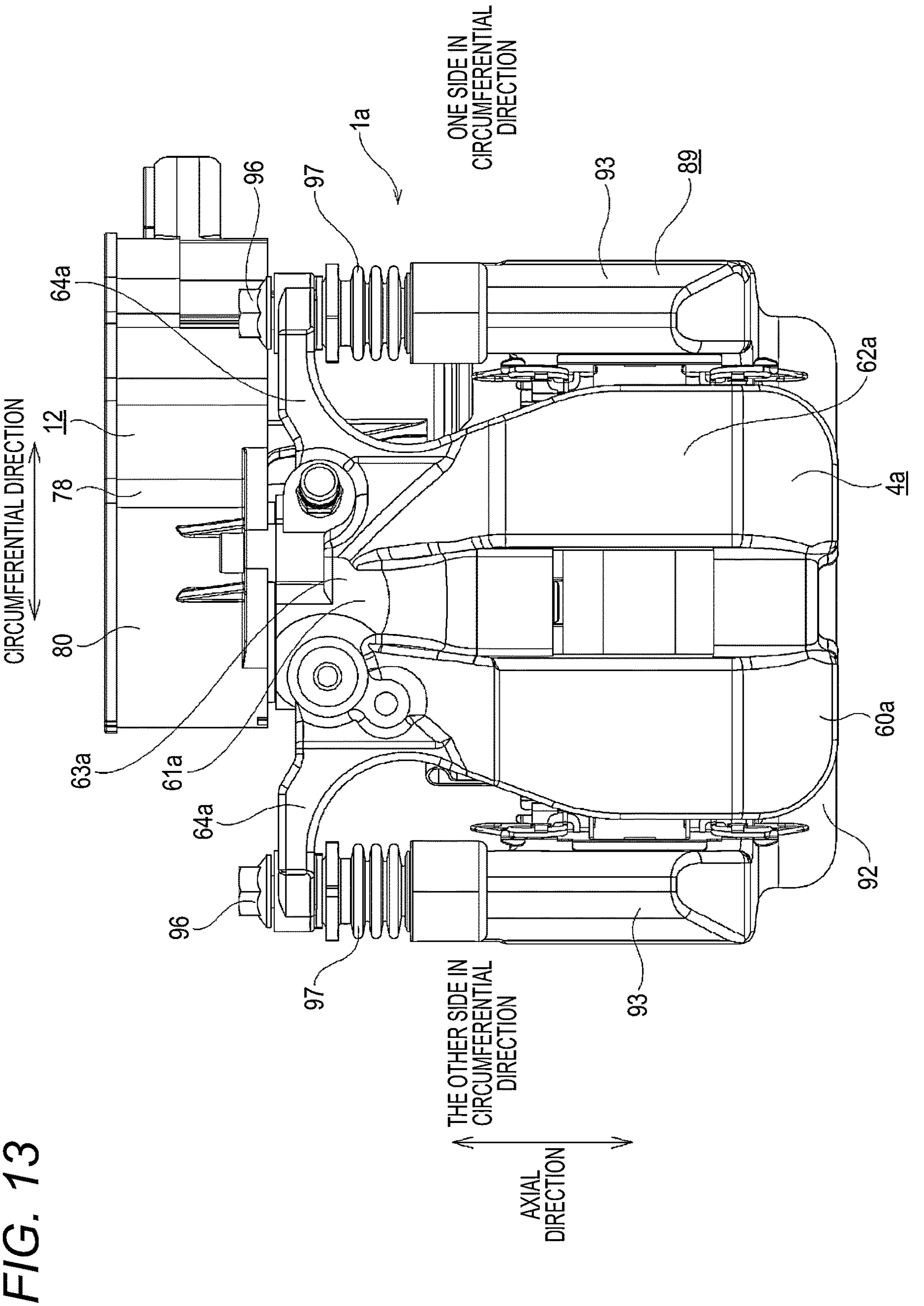
FIG. 13 is a plan view showing a disc brake device according to a second example of the embodiment.
Figure 14:
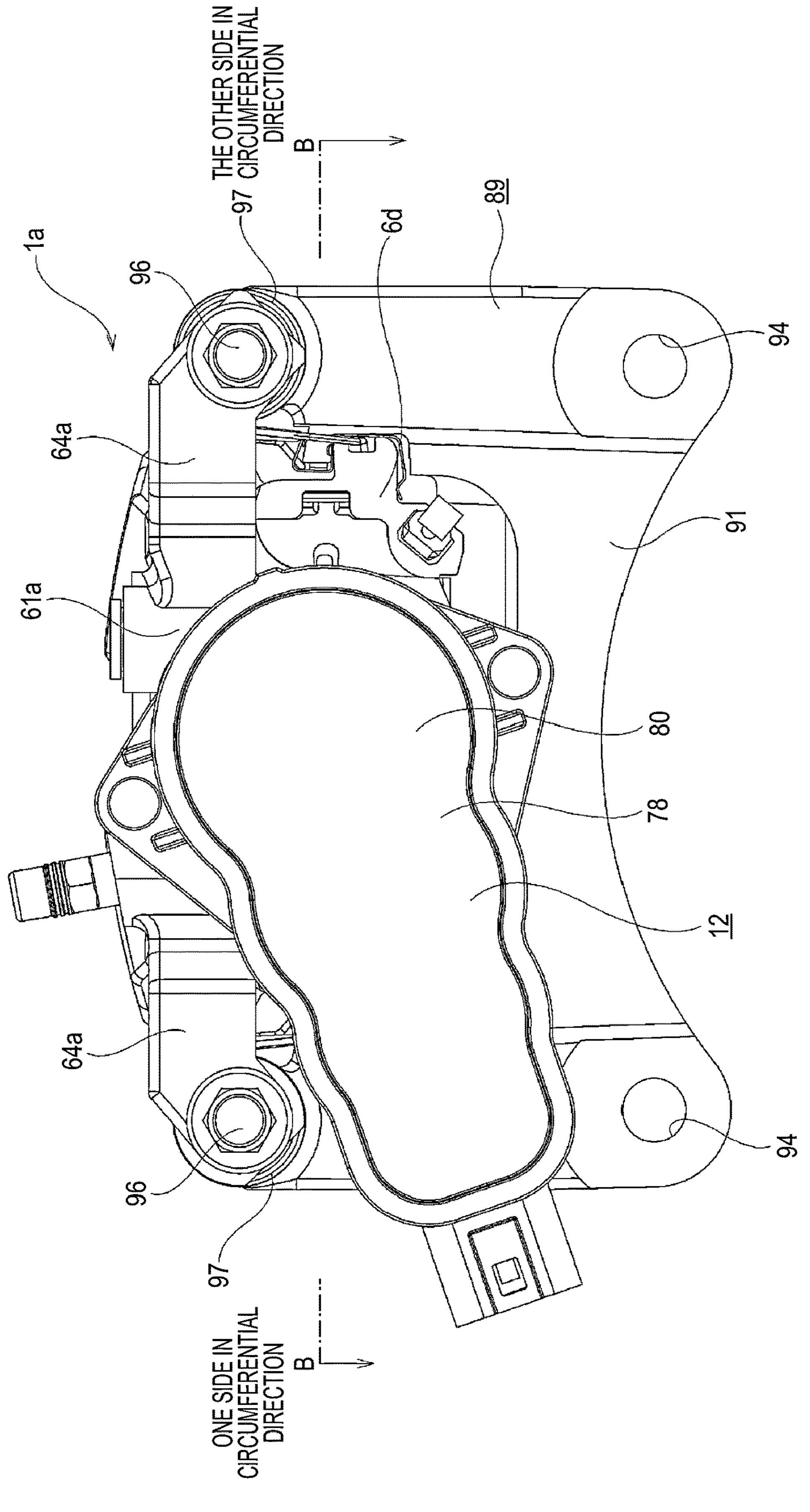
FIG. 14 is a rear view showing the disc brake device of the second example of the embodiment.
Figure 15:
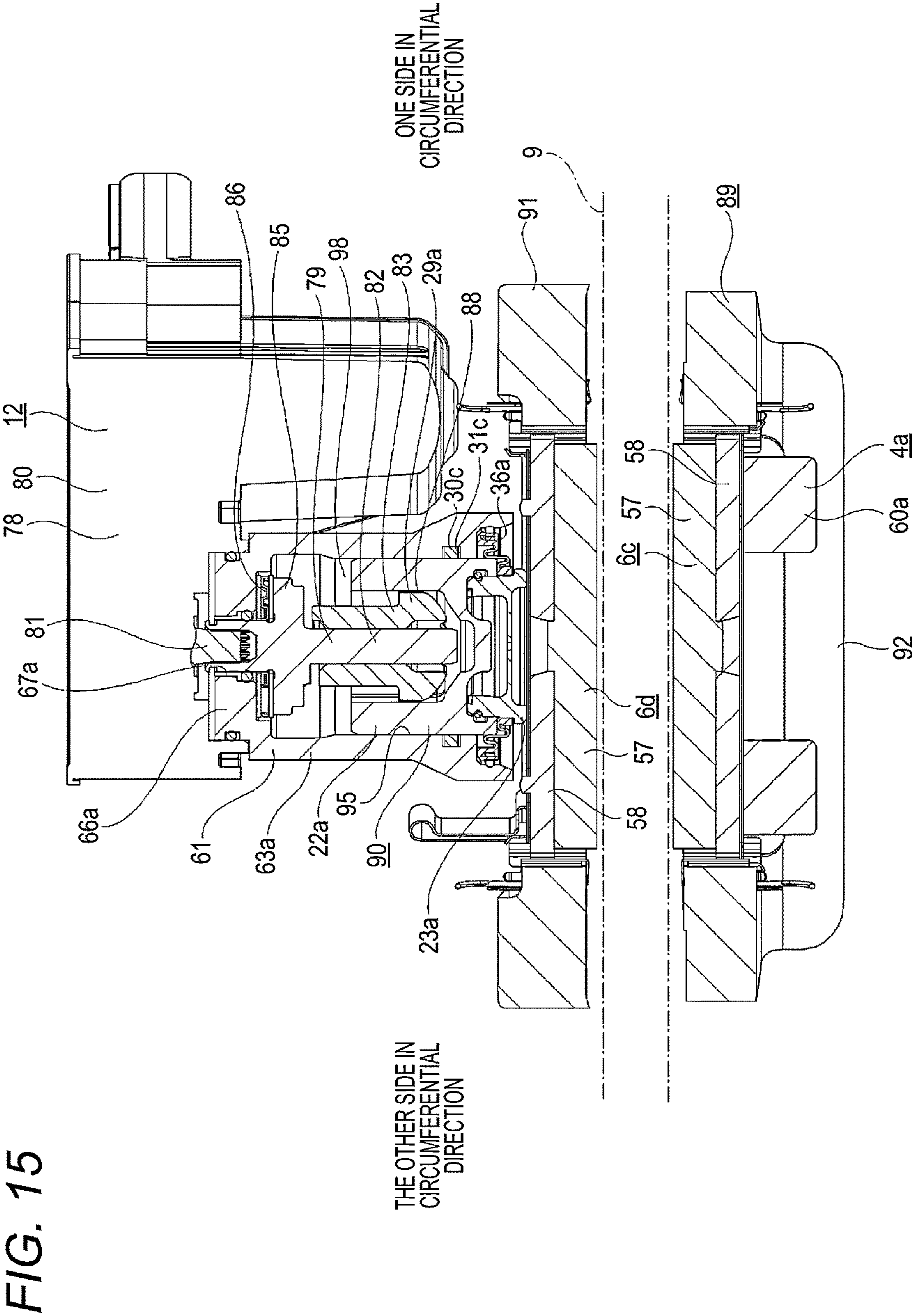
FIG. 15 is a cross-sectional view taken along a line B-B in FIG. 14.
Figure 16:
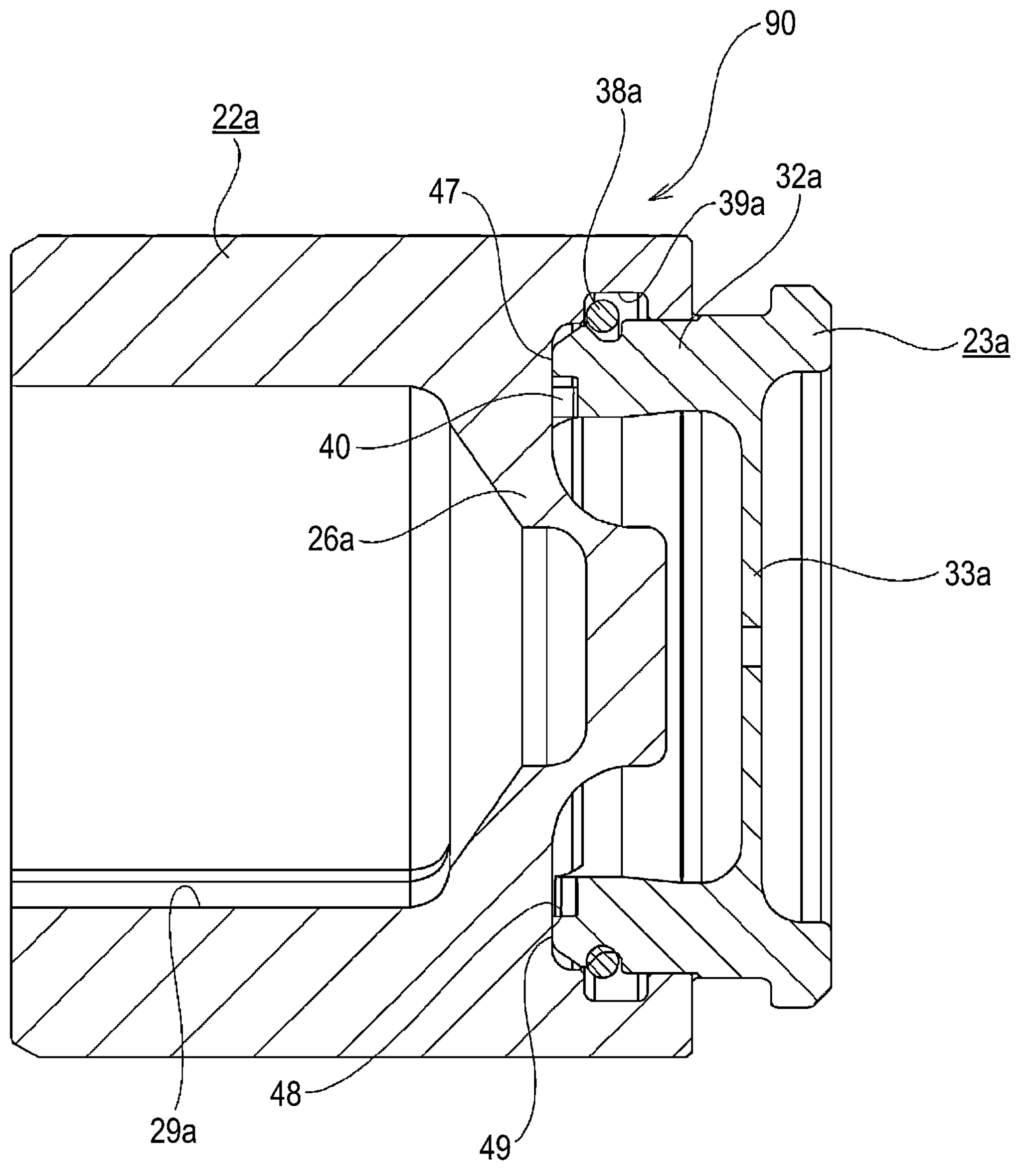
FIG. 16 is a cross-sectional view showing a piston taken out in the second example of the embodiment.

On the contrary, as shown in FIG. 11B and FIG. 12B, when the spindle 82 is driven to rotate in the reverse rotation direction, the main body-side guide surfaces 44, which are inclined surfaces, simultaneously come into contact with the cap-side guide surfaces 46, which are inclined surfaces. Here, the piston cap 23 including the cap-side engagement portion 42 is held so as to be displaceable relative to the piston main body 22 including the main body-side engagement portion 41 in the axial direction, and displacement to the axially outer side is regulated by the rotor 9. Therefore, the cap-side guide surface 46 can push up the main body-side guide surface 44 in the axial direction (move the main body-side guide surface 44 to a side opposite to the rotor 9) by using the inclination. Accordingly, the relative rotation (displacement) of the piston main body 22 with respect to the piston cap 23 in the reverse rotation direction is allowed.

In the present example, a sufficiently large play (backlash) in the axial direction between the piston ring 38 and the holding recessed groove 39 is ensured. Specifically, the piston cap 23 is held so as to be displaceable relative to the piston main body 22 in the axial direction as much as the main body-side engagement portion 41 gets over the cap-side engagement portion 42. Therefore, the main body-side engagement portion 41 gets over the cap-side engagement portion 42, and thus the piston main body 22 is allowed to rotate relative to the piston cap 23 in the reverse rotation direction.

An axial force transmitting portion 47 for transmitting an axial force between the piston main body 22 and the piston cap 23 is further provided between the piston main body 22 and the piston cap 23, separately from the unidirectional rotation regulating portion 40.

The axial force transmitting portion 47 includes a main body-side transmission surface 48 provided in the piston main body 22 and a cap-side transmission surface 49 provided in the piston cap 23. The main body-side transmission surface 48 and the cap-side transmission surface 49 are disposed to face each other in the axial direction.

As shown in FIGS. 7A and 7B, the main body-side transmission surface 48 has an annular shape, and is provided radially outward of the main body-side engagement portion 41 on the axially outer surface of the partition wall portion 26 of the piston main body 22. The main body-side transmission surface 48 is formed in a flat surface shape, and is disposed on a virtual plane orthogonal to the central axis $O_{22}$ of the piston main body 22.

As shown in FIGS. 9A and 9B, the cap-side transmission surface 49 has an annular shape, and is provided radially outward of the cap-side engagement portion 42 on the axially inner end surface of the cylindrical portion 32 of the piston cap 23. The cap-side transmission surface 49 is formed in a flat surface shape, and is disposed on a virtual plane orthogonal to the central axis $O_{23}$ of the piston cap 23.

<Service-Dedicated Piston>

The service-dedicated piston 8 has a two-part structure similarly to the dual-purpose piston 7. As shown in FIG. 3, the service-dedicated piston 8 includes a cylindrical portion 106 made of, for example, carbon steel and having a bottomed cylindrical shape, and a lid portion 107 made of, for example, stainless steel and mounted in a distal end portion of the cylindrical portion 106. A hydraulic chamber 50 for introducing pressure oil is formed between a bottom surface of the service-dedicated piston 8 and a deep portion of each of the cylinders 10*a*, 10*b*, and 11*b* into which the service-dedicated piston 8 is fitted. In addition, an annular piston seal 52 is mounted in a seal groove 51 formed on an inner peripheral surface of each of the cylinders 10*a*, 10*b*, and 11*b*. In addition, a dust cover 53 is bridged between an opening edge portion of each of the cylinders 10*a*, 10*b*, and 11*b* and a distal end portion of the service-dedicated piston 8.

The brake oil is fed to hydraulic chambers 28 and 50 of the cylinders 10*a*, 10*b*, 11*a*, and 11*b* through oil passages 18*a* and 18*b* provided in the outer body portion 13 and the inner body portion 14. In the present example, a pressure receiving area of the dual-purpose piston 7 and a pressure receiving area of the service-dedicated piston 8 facing the dual-purpose piston 7 are equal to each other. Therefore, during service braking, the dual-purpose piston 7 and the service-dedicated piston 8 (and other service-dedicated pistons 8) axially opposed to the dual-purpose piston 7 press both axial side surfaces of the rotor 9 with equal forces. An opening of the oil passage 18*a* is closed by a bleeder screw 54.

A pair of guide wall portions 55*a* and 55*b* protruding in the axial direction so as to be close to the rotor 9 are respectively provided on both circumferential side portions of the axially inner surface of the outer body portion 13 and on both circumferential side portions of the axially outer surface of the inner body portion 14. The guide wall portion 55*a* disposed on one side in the circumferential direction is provided with a guide recessed groove 56*a* that is opened in the axial direction and is opened to the other side in the circumferential direction, and the guide wall portion 55*b* disposed on the other side in the circumferential direction is provided with a guide recessed groove 56*b* that is opened in the axial direction and is opened to the one side in the circumferential direction.

<Outer Pad and Inner Pad>

The outer pad 6*a* and the inner pad 6*b* are disposed on both sides of the rotor 9 in the axial direction. Specifically, the outer pad 6*a* is disposed between the rotor 9 and the outer body portion 13, and the inner pad 6*b* is disposed between the rotor 9 and the inner body portion 14. Each of the outer pad 6*a* and the inner pad 6*b* includes a lining (friction material) 57 and a metal-made back plate (pressure plate) 58 that supports a back surface of the lining 57. In the present example, the inner pad 6*b* corresponds to a pad described in the claims.

Both circumferential side portions of the back plate 58 are provided with ear portions 59 protruding in the circumferential direction. The pair of ear portions 59 provided in the outer pad 6*a* are loosely engaged with the pair of guide recessed grooves 56*a* and 56*b* provided in the outer body portion 13, respectively. In addition, the pair of ear portions

59 provided in the inner pad 6*b* are loosely engaged with the pair of guide recessed grooves 56*a* and 56*b* provided in the inner body portion 14, respectively. Accordingly, the outer pad 6*a* and the inner pad 6*b* are supported with respect to the caliper 4 so as to be displaceable in the axial direction and so as not to be displaceable in the circumferential direction and the radial direction. In addition, a substantially columnar engagement protrusion 35 (see FIG. 5) protruding axially inward is provided on a back surface of the back plate 58 composing the inner pad 6*b*. The engagement recess 34 of the piston cap 23 composing the dual-purpose piston 7 is engaged with the engagement protrusion 35.

<Floating Type Brake Mechanism>

The clamp member 5 composing the floating type brake mechanism 3 is made of an aluminum-based alloy or an iron-based alloy, and has an inverted U-shape. The clamp member 5 is disposed on a portion between the rotation-in side coupling portion 15*a* and the intermediate coupling portion 16 in the circumferential direction, and straddles the pair of pads 6*a* and 6*b* and the inner body portion 14 from the radially outer side. That is, the clamp member 5 is mounted on the caliper 4. The clamp member 5 has a bifurcated pressing portion 60 in an axially outer portion and a clamp base portion 61 in an axially inner portion. In addition, the clamp member 5 includes a bridge portion 62 that is disposed on the radially outer side of the rotor 9 and couples the pressing portion 60 and the clamp base portion 61 in the axial direction.

The pressing portion 60 is inserted from the radially outer side into a portion between an axially inner surface of a half portion of the outer body portion 13 on one side in the circumferential direction and an axially outer surface of a half portion of the outer pad 6*a* on one side in the circumferential direction so as to straddle the rotation-in side outer cylinder 10*a*.

The clamp base portion 61 is disposed axially inside the inner body portion 14, and includes a base body 63 and one arm portion 64 extending from the base body 63 to the other side in the circumferential direction. As shown in FIGS. 3 and 4, the base body 63 includes an accommodation portion 65 of which is a substantially cylindrical space therein. The accommodation portion 65 is opened axially outward, but an opening on the axially inner side is closed by a bottom portion 66. The accommodation portion 65 has an inner diameter slightly larger than an outer diameter of the guide cylinder 21 provided in the inner body portion 14. A through hole 67 penetrating in the axial direction is provided in a central portion of the bottom portion 66.

A support cylindrical portion 68 extending in the axial direction is provided at a distal end portion of the arm portion 64. The support cylindrical portion 68 is opened on both sides in the axial direction, and a central axis of the support cylindrical portion 68 and a central axis of the accommodation portion 65 provided in the base body 63 are parallel to each other.

<Support Structure of Clamp Member>

The clamp member 5 as described above is supported so as to be displaceable with respect to the caliper 4 in the axial direction. In the present example, the clamp member 5 is supported with respect to the caliper 4 by a total of three points, a first guide portion 69, a second guide portion 70, and a third guide portion 71.

As shown in FIGS. 3 and 4, the first guide portion 69 includes the guide cylinder 21 provided in the inner body portion 14 and the accommodation portion 65 provided in the clamp base portion 61. That is, the first guide portion 69 is formed by fitting a distal half portion of the guide cylinder 21 inside the accommodation portion 65 so as to be relatively displaceable in the axial direction. In addition, a central axis of the guide cylinder 21 and the central axis of the accommodation portion 65 are disposed coaxially with each other. A radial gap between an outer peripheral surface of the guide cylinder 21 and an inner peripheral surface of the accommodation portion 65 is set to such a size that prying does not occur between the outer peripheral surface of the guide cylinder 21 and the inner peripheral surface of the accommodation portion 65 even when the pressing portion 60 and the clamp base portion 61 are axially displaced away from each other during parking braking. In addition, a seal groove 72 having a substantially rectangular cross-sectional shape is formed in an axially inner portion of the inner peripheral surface of the accommodation portion 65, and an annular seal member 73 is mounted in the seal groove 72. Accordingly, the seal member 73 is sandwiched between the outer peripheral surface of the guide cylinder 21 and the inner peripheral surface of the accommodation portion 65, and the guide cylinder 21 is hermetically fitted into the accommodation portion 65. In addition, a dust cover 74 is bridged between an opening edge portion of the accommodation portion 65 and an axially intermediate portion of the outer peripheral surface of the guide cylinder 21.

The second guide portion 70 is provided at the same position as the intermediate coupling portion 16 in the circumferential direction, which is deviated from the first guide portion 69 in the circumferential direction, and supports the clamp member 5 together with the first guide portion 69 so as to be displaceable with respect to the caliper 4 in the axial direction. The second guide portion 70 includes a support cylindrical portion 68 provided on the arm portion 64 composing the clamp base portion 61, and an inner guide pin 75 fixed to the inner body portion 14. The inner guide pin 75 has an axially outer portion fixed to the inner body portion 14, and an axially intermediate portion inserted into the support cylindrical portion 68 so as to be slidable (relatively displaceable) in the axial direction. Therefore, the inner guide pin 75 is bridged in the axial direction between the inner body portion 14 and the support cylindrical portion 68. In addition, a central axis of the inner guide pin 75 and the central axis of the guide cylinder 21 are disposed parallel to each other.

The third guide portion 71 is provided at the same position as the first guide portion 69 in the circumferential direction, and supports the clamp member 5 together with the first guide portion 69 and the second guide portion 70 so as to be displaceable with respect to the caliper 4 in the axial direction. The third guide portion 71 includes a protruding support portion 76 provided in the outer body portion 13 and an outer guide pin 77 fixed to the clamp member 5. The protruding support portion 76 is provided on a radially outer side of the rotation-in side outer cylinder 10*a* in the outer body portion 13. The outer guide pin 77 has an axially inner portion fixed to the pressing portion 60 of the clamp member 5, and an axially outer portion inserted into the protruding support portion 76 so as to be slidable (relatively displaceable) in the axial direction. Therefore, the outer guide pin 77 is bridged in the axial direction between the outer body portion 13 and the pressing portion 60. In addition, a central axis of the outer guide pin 77 and the central axis of the accommodation portion 65 are disposed parallel to each other.

<Actuator>

The electric actuator 12 composing the floating type brake mechanism 3 includes an electric drive device (MGU) 78 disposed axially inside the clamp base portion 61, and a rotary-to-linear motion conversion mechanism 79 disposed inside the accommodation portion 65.

The electric drive device 78 includes a casing 80, and an electric motor as a drive source and a speed reduction mechanism such as a gear type speed reducer, which are accommodated inside the casing 80. A rotation shaft 81 to which a final gear composing the speed reduction mechanism is fixed is inserted into the through hole 67 formed in the bottom portion 66 of the clamp base portion 61.

As shown in FIGS. 3 and 4, the rotary-to-linear motion conversion mechanism 79 is a feed screw mechanism that converts a rotary motion into a linear motion and changes an entire length in the axial direction during operation, and includes the spindle 82 corresponding to a rotary member described in the claims and a nut 83 corresponding to a linear motion member described in the claims.

The spindle 82 has a male screw portion 84 on an outer peripheral surface ranging from a distal end portion (axially outer portion) to an intermediate portion. A flange portion 85 having a larger diameter than other portions is provided at a portion of the spindle 82 near a proximal end. A proximal end portion (axially inner portion) of the spindle 82 is rotatably supported inside the through hole 67 formed in the bottom portion 66 of the clamp base portion 61, and is connected to a distal end portion of the rotation shaft 81 so as not to be rotatable relative to the distal end portion of the rotation shaft 81. Therefore, the spindle 82 can be rotationally driven by the electric motor.

The distal end portion of the spindle 82 is inserted into the dual-purpose piston 7 from the axially inner side. A central axis of the spindle 82 is coaxial with the central axis of the accommodation portion 65 (guide cylinder 21). A thrust bearing 86 is disposed between an axially inner surface of the flange portion 85 and an axially outer surface of the bottom portion 66. Accordingly, an axial load acting on the flange portion 85 can be supported by the bottom portion 66, and the flange portion 85 can rotate with respect to the bottom portion 66.

The nut 83 has a female screw portion 87 on an inner peripheral surface thereof, and is screwed to the male screw portion 84 provided on the spindle 82. A male spline 88 having a larger diameter than other portions is provided at a distal end portion (axially outer portion) of the nut 83. In a state in which the nut 83 is disposed inside the small diameter cylindrical portion 25 of the piston main body 22, the male spline 88 is spline-engaged with the female spline 29 formed on the inner peripheral surface of the small diameter cylindrical portion 25. Therefore, the nut 83 is engaged with the dual-purpose piston 7 so as to be relatively displaceable in the axial direction and so as not to be relatively rotatable. Therefore, the nut 83 is movable in the axial direction by rotating the spindle 82. Specifically, when the spindle 82 is driven to rotate in the forward rotation direction, the nut 83 moves toward the rotor 9 and presses the piston main body 22 in the axial direction, whereas when the spindle 82 is driven to rotate in the reverse rotation direction, the nut 83 moves toward the side opposite to the rotor 9.

<Description of Operation of Disc Brake Device>

When the service brake is operated by the disc brake device 1 of the present example, the brake oil is fed to the hydraulic chambers 28 and 50 of all the cylinders 10*a*, 10*b*, 11*a*, and 11*b* provided in the caliper 4 through the oil passages 18*a* and 18*b*. Accordingly, all the pistons 7 and 8 (one dual-purpose piston 7 and three service-dedicated pistons 8) are pushed out from the cylinders 10*a*, 10*b*, 11*a*, and 11*b*, and the pair of pads 6*a* and 6*b* are pressed against both axial side surfaces of the rotor 9. As a result, the rotor 9 is strongly pressed from both sides in the axial direction to perform braking. In this way, the disc brake device 1 obtains the braking force of the service brake by pushing out all the pistons 7 and 8 by introducing the brake oil.

When the parking brake is operated by the disc brake device 1, the electric motor composing the electric drive device 78 is energized, and the spindle 82 composing the rotary-to-linear motion conversion mechanism 79 is driven to rotate in the forward rotation direction. At this time, a torque in the forward rotation direction acts on the piston main body 22 from the nut 83. Therefore, the piston main body 22 tends to rotate relative to the piston cap 23 in the forward rotation direction. However, since the piston seal 30*a* (30*b*) is sandwiched between the piston main body 22 and the rotation-in side inner cylinder 11*a*, the rotation of the piston main body 22 is regulated by the frictional force acting between the piston main body 22 and the piston seal 30*a* (30*b*). Therefore, the nut 83 and the piston main body 22 do not rotate, and the nut 83 is moved axially outward with respect to the inner body portion 14. The distal end portion of the nut 83 is pressed against the axially inner surface of the partition wall portion 26 of the dual-purpose piston 7, and the dual-purpose piston 7 is pushed out toward the rotor 9, and thus the inner pad 6*b* is pressed against the axially inner surface of the rotor 9.

In addition, a reaction force caused by the pressing is transmitted from the spindle 82 to the clamp member 5 via the thrust bearing 86. Accordingly, the spindle 82 and the clamp member 5 are displaced axially inward with respect to the caliper 4. At this time, the guide cylinder 21 and the accommodation portion 65 (first guide portion 69), the inner guide pin 75 and the support cylindrical portion 68 (second guide portion 70), and the outer guide pin 77 and the protruding support portion 76 (third guide portion 71) slide in the axial direction. The outer pad 6*a* is pressed against the axially outer surface of the rotor 9 by the pressing portion 60 of the clamp member 5. Accordingly, the rotor 9 is sandwiched from both sides in the axial direction by the pair of pads 6*a* and 6*b*, and the braking force is obtained. In this way, the disc brake device 1 obtains the braking force of the parking brake by pushing out the dual-purpose piston 7 using the electric actuator 12 and displacing the clamp member 5 axially inward with respect to the caliper 4.

On the contrary, in order to release the parking brake, the spindle 82 is driven to rotate in the reverse rotation direction by the electric motor composing the electric drive device 78. At this time, a torque in the reverse rotation direction acts on the piston main body 22 from the nut 83. Therefore, the piston main body 22 tends to rotate relative to the piston cap 23 in the reverse rotation direction. However, since the piston seal 30*a* (30*b*) is sandwiched between the piston main body 22 and the rotation-in side inner cylinder 11*a*, the rotation of the piston main body 22 is regulated by the frictional force acting between the piston main body 22 and the piston seal 30*a* (30*b*) as long as the torque acting on the piston main body 22 from the nut 83 does not excessively increase as in the case where the nut 83 and the spindle 82 are in a locked state. Accordingly, the nut 83 is displaced axially inward with respect to the inner body portion 14. In addition, the clamp member 5 is displaced axially outward with respect to the inner body portion 14 by displacing the spindle 82 axially outward with respect to the inner body portion 14. At this time, the guide cylinder 21 and the accommodation portion 65, the inner guide pin 75 and the support cylindrical portion 68, and the outer guide pin 77 and the protruding support portion 76 slide in the axial direction.

According to the disc brake device 1 of the present example as described above, it is possible to stably obtain the braking force of the parking brake while preventing the temperature rise of the brake oil accommodated in the hydraulic chamber 28 of the rotation-in side inner cylinder 11*a*, and it is possible to solve the problem caused when the nut 83 is fully released to the side opposite to the rotor 9.

That is, in the present example, the dual-purpose piston 7 has a two-part structure including the piston main body 22 and the piston cap 23. Therefore, even in a case where the inner pad 6*b* heats up when pressed against the rotating rotor 9, in the present example in which the dual-purpose piston 7 is used, the amount of heat transferred to the brake oil accommodated in the hydraulic chamber 28 can be reduced as compared with the case where the piston has an integrated structure. In addition, since the dual-purpose piston 7 has the two-part structure, the hydraulic chamber 28 can be away from the inner pad 6*b*. Therefore, it is possible to prevent an increase in temperature of the brake oil. As a result, deterioration of the brake oil can be prevented, and occurrence of a vapor lock phenomenon can be prevented.

As described above, when the braking force of the parking brake is obtained, the torque in the forward rotation direction that drives the spindle 82 to rotate in the forward rotation direction and acts on the piston main body 22 from the nut 83 is supported by the frictional force between the piston main body 22 and the piston seal 30*a* (30*b*). However, depending on use conditions of the disc brake device 1, a contact state between the piston main body 22 and the piston seal 30*a* (30*b*) becomes unstable, and there is a possibility that a sufficient frictional force cannot be obtained by the piston seal 30*a* (30*b*). In such a case, when the piston main body 22 rotates relative to the piston cap 23 in the forward rotation direction, the dual-purpose piston 7 cannot be pushed out to the rotor 9, and it is difficult to obtain a stable braking force.

In the disc brake device 1 of the present example, since the unidirectional rotation regulating portion 40 is disposed between the piston main body 22 and the piston cap 23 composing the dual-purpose piston 7, it is possible to prevent the piston main body 22 and the piston cap 23 from rotating relative to each other even when a sufficient frictional force cannot be obtained by the piston seal 30*a* (30*b*).

Specifically, as shown in FIG. 11A and FIG. 12A, the main body-side engagement portion 41 and the cap-side engagement portion 42 can be mechanically engaged with each other by allowing the main body-side regulating surface 43, which is the right angle surface of the main body-side engagement portion 41 provided in the piston main body 22, to come into surface contact with the cap-side regulating surface 45, which is the right angle surface of the cap-side engagement portion 42 provided in the piston cap 23. Therefore, it is possible to regulate the relative rotation of the piston main body 22 with respect to the piston cap 23 in the forward rotation direction. Therefore, the braking force of the parking brake can be stably obtained. In addition, in the present example, the engagement protrusion 35 provided in the inner pad 6*b* is engaged with the engagement recess 34 provided in the piston cap 23 to prevent the piston cap 23 from rotating. Therefore, as compared with the case where the frictional force acting between the piston cap and the inner pad is used to prevent rotation, the rotation can be reliably prevented, and the braking force can be more stably obtained.

Further, when the spindle 82 is driven to rotate in the reverse rotation direction to release the braking force of the parking brake, even if the nut 83 is fully released to the side opposite to the rotor 9 until the nut 83 abuts against the axially outer surface of the flange portion 85 due to malfunction of the electric motor, pad replacement work, or the like, it is possible to effectively prevent a decrease in durability of the electric motor and the speed reduction mechanism composing the electric drive device 78.

That is, as shown by a chain line in FIG. 4, when the nut 83 is fully released to the side opposite to the rotor 9, the nut 83 and the spindle 82 are in the locked state, and the torque acting on the piston main body 22 from the nut 83 rapidly increases. When the torque acting on the piston main body 22 excessively increases, the frictional force acting between the piston main body 22 and the piston seal 30*a* (30*b*) is overcome, and the piston main body 22 attempts to rotate in the reverse rotation direction. As shown in FIG. 11B and FIG. 12B, the main body-side guide surface 44, which is the inclined surface of the main body-side engagement portion 41 provided in the piston main body 22, comes into contact with the cap-side guide surface 46, which is the inclined surface of the cap-side engagement portion 42 provided in the piston cap 23. Here, the piston cap 23 including the cap-side engagement portion 42 is held so as to be displaceable relative to the piston main body 22 in the axial direction by using the piston ring 38, and the displacement to the axially outer side is regulated by the rotor 9. Therefore, the cap-side guide surface 46 can push up the main body-side guide surface 44 in the axial direction (move the main body-side guide surface 44 to the side opposite to the rotor 9) by using the inclination. Accordingly, the relative rotation (displacement) of the piston main body 22 with respect to the piston cap 23 in the reverse rotation direction is allowed. As a result, it is possible to effectively prevent the electric motor composing the electric drive device from reaching a stall torque (maximum current). Therefore, it is possible to prevent a decrease in durability of the electric motor. In addition, since it is possible to prevent the torque acting on the speed reduction mechanism such as the gear type speed reducer from excessively increasing, it is also possible to prevent a decrease in durability of the speed reduction mechanism.

Further, in the present embodiment, a sufficiently large play (backlash) in the axial direction between the piston ring 38 and the holding recessed groove 39 is ensured as much as the main body-side engagement portion 41 gets over the cap-side engagement portion 42. Therefore, the piston main body 22 is allowed to rotate (displace) not only about several degrees but also to completely rotate relative to the piston cap 23 as the main body-side engagement portion 41 rides on the cap-side engagement portion 42. Therefore, damage to the electric motor and the speed reduction mechanism can be effectively prevented.

In addition, even when the nut 83 is fully released to the side opposite to the rotor 9 and the nut 83 and the spindle 82 are in the locked state, the piston main body 22 can be rotated with respect to the piston cap 23 in the reverse rotation direction. Therefore, it is possible to prevent a torque from acting on the piston boot 36 that is bridged between the piston cap 23 and the opening edge portion of the rotation-in side inner cylinder 11*a*. Accordingly, damage to the piston boot 36 can be prevented.

Second Example of Embodiment

A second example of the embodiment will be described with reference to FIGS. 13 to 16. In the present example, the same components as those of the first example of the embodiment are denoted by the same reference numerals as those of the first example of the embodiment, and a detailed description thereof will be omitted.

Similarly to the first example of the embodiment, a disc brake device 1*a* of the present example is an electric parking brake type disc brake device, and has both a function of a hydraulic service brake and a function of an electric parking brake.

The disc brake device 1*a* includes a support 89, a caliper 4*a*, a pair of pads 6*c* and 6*d* (outer pad 6*c* and inner pad 6*d*), one piston 90, and the electric actuator 12.

The support 89 is a cast product of an iron-based alloy such as cast iron, and includes a support base portion 91 disposed on an axially inner side of the rotor 9 (see FIG. 15), an outer coupling portion 92 disposed on an axially outer side of the rotor 9, and a pair of coupling arm portions 93 that respectively couple end portions on both sides in a circumferential direction of the support base portion 91 and end portions on both sides in a circumferential direction of the outer coupling portion 92 in the axial direction. The support 89 is fixed to a suspension device using a pair of attachment holes 94 formed in a radially inner portion of the support base portion 91. A guide hole (not shown) that is opened axially inward is formed in a radially outer portion (rotor path portion) of each of the coupling arm portions 93.

The outer pad 6*c* is disposed on an axially outer side of the rotor 9, and is supported so as to be displaceable with respect to the support 89 in the axial direction. In addition, the inner pad 6*d* is disposed on an axially inner side of the rotor 9, and is supported so as to be displaceable with respect to the support 89 in the axial direction.

The caliper 4*a* is made of an aluminum-based alloy or an iron-based alloy and has an inverted U-shape. The caliper 4*a* has a bifurcated pressing portion 60*a* in an axially outer portion and a clamp base portion 61*a* in an axially inner portion. In addition, the caliper 4*a* includes a bridge portion 62*a* that is disposed on the radially outer side of the rotor 9 and couples the pressing portion 60*a* and the clamp base portion 61*a* in the axial direction.

The clamp base portion 61*a* includes a base body 63*a* and a pair of arm portions 64*a* that extend from the base body 63*a* to both sides in the circumferential direction. The base body 63*a* has a cylinder 95 of which is a substantially cylindrical space therein. The cylinder 95 is opened axially outward, but an opening on the axially inner side is closed by a bottom portion 66*a*.

The caliper 4*a* as described above is supported so as to be displaceable with respect to the support 89 in the axial direction. For this reason, axially inner end portions of a guide pin 96 are fixed to the pair of arm portions 64*a* that composing the clamp base portion 61*a*, and the end portions or an intermediate portion of the guide pin 96 on an axially inner side are inserted into guide holes formed in the pair of coupling arm portions 93 that compose the support 89 so as to be relatively displaceable in the axial direction. In addition, a boot 97 is bridged between an outer peripheral surface of the guide pin 96 and an opening of the guide hole.

The piston 90 has a divided structure divided into two parts in the axial direction. The piston 90 includes a piston main body 22*a* and a piston cap 23*a*.

The piston main body 22*a* is made of a metal such as carbon steel, has a bottomed cylindrical shape, and is fitted to the cylinder 95. The piston main body 22*a* includes a partition wall portion 26*a* having a substantially disc shape. The partition wall portion 26*a* is disposed in an axially intermediate portion of the piston main body 22*a*, and partitions the inside of the piston main body 22*a* in the axial direction. A female spline 29*a* is provided axially inward of the partition wall portion 26*a* on an inner peripheral surface of the piston main body 22*a*.

A portion between the piston main body 22*a* and the cylinder 95 is sealed by an annular piston seal 30*c*. The piston seal 30*c* is mounted in a seal groove 31*c* formed in an inner peripheral surface of an axially outer portion of the cylinder 95.

The piston cap 23*a* is made of, for example, stainless steel, titanium, or synthetic resin, includes a cylindrical portion 32*a* and a closing plate portion 33*a*, and is formed in a bottomed cylindrical shape. In the piston cap 23*a*, an axially inner portion of the cylindrical portion 32*a* is disposed inside the piston main body 22*a*, and an axially outer portion of the cylindrical portion 32*a* is prevented from rotating with respect to the inner pad 6*d*. A piston boot 36*a* is bridged between the cylindrical portion 32*a* of the piston cap 23*a* and an axially outer opening edge portion of the cylinder 95.

A piston ring 38*a* is externally fitted to a portion of the cylindrical portion 32*a* of the piston cap 23*a* disposed inside the piston main body 22*a*. The piston ring 38*a* has a circular cross-sectional shape, and a radially outer portion thereof is engaged with a holding recessed groove 39*a* having a substantially rectangular cross-sectional shape provided on an inner peripheral surface of an axially outer portion of the piston main body 22*a* so as to be displaceable in the axial direction.

Also in the case of the present example, the piston main body 22*a* and the piston cap 23*a* are connected to each other via the unidirectional rotation regulating portion 40 having the same configuration as that of the first example of the embodiment described above. Therefore, on the axially outer surface of the partition wall portion 26*a* of the piston main body 22*a*, the main body-side engagement portions 41 (see FIGS. 7A and 7B, and the like) each having a convex shape are disposed at equal intervals in the circumferential direction, and on the axially inner end surface of the cylindrical portion 32*a* of the piston cap 23*a*, the cap-side engagement portions 42 (see FIGS. 9A and 9B, and the like) each having a convex shape are disposed at equal intervals in the circumferential direction.

Similarly to the structure of the first example of the embodiment, the axial force transmitting portion 47 for transmitting an axial force between the piston main body 22*a* and the piston cap 23*a* is further provided between the piston main body 22 and the piston cap 23, separately from the unidirectional rotation regulating portion 40. Therefore, the annular main body-side transmission surface 48 is provided radially outward of the main body-side engagement portion 41 on the axially outer surface of the partition wall portion 26*a* of the piston main body 22*a*, and the annular cap-side transmission surface 49 is provided radially outward of the cap-side engagement portion 42 on the axially inner end surface of the cylindrical portion 32*a* of the piston cap 23*a*.

The electric actuator 12 has the same configuration as that of the first example of the embodiment, and includes the electric drive device 78 disposed axially inside the clamp base portion 61*a*, and the rotary-to-linear motion conversion mechanism 79 disposed inside the cylinder 95. The rotation shaft 81 composing the electric drive device 78 is inserted into a through hole 67*a* formed in a bottom portion 66*a* of the clamp base portion 61*a*, and a proximal end portion of the spindle 82 composing the rotary-to-linear motion conversion mechanism 79 is connected to the distal end portion of the rotation shaft 81 so as not to be rotatable relative to the distal end portion of the rotation shaft 81.

By the nut 83 screwed to the distal end portion or the intermediate portion of the spindle 82, the male spline 88 formed on the outer peripheral surface is spline-engaged with a female spline 29*a* formed on an inner peripheral surface of the piston 90. Accordingly, the nut 83 is disposed inside the piston 90 so as to be displaceable in the axial direction and so as not to be relatively rotatable.

In order to obtain a braking force of a service brake by the disc brake device 1*a* of the present example, brake oil is fed to the hydraulic chamber 98 of the cylinder 95 provided in the caliper 4*a* through an oil passage (not shown). Accordingly, the piston 90 is pushed out from the cylinder 95, and the inner pad 6*d* is pressed against the axially inner surface of the rotor 9. In addition, a reaction force caused by the pressing is transmitted from the spindle 82 to the caliper 4*a* via the thrust bearing 86. Accordingly, the caliper 4*a* is displaced axially inward with respect to the support 89. The outer pad 6*c* is pressed against the axially outer surface of the rotor 9 by the pressing portion 60*a* of the caliper 4*a*. As a result, the rotor 9 is strongly pressed from both sides in the axial direction to perform braking. In this way, the disc brake device 1*a* obtains the braking force of the service brake by pushing out the piston 90 by introducing the brake oil.

On the contrary, similarly to the structure of the first example of the embodiment, in order to obtain a braking force of a parking brake by the disc brake device 1*a* of the present example, the electric motor composing the electric drive device 78 is energized, and the spindle 82 is driven to rotate in the forward rotation direction. Accordingly, the nut 83 is displaced axially outward with respect to the support 89. The distal end portion of the nut 83 is pressed against the axially inner surface of the partition wall portion 26*a* of the piston main body 22*a*, and the piston 90 is pushed out toward the rotor 9, and thus the inner pad 6*d* is pressed against the axially inner surface of the rotor 9. In addition, a reaction force caused by the pressing is transmitted from the spindle 82 to the caliper 4*a* via the thrust bearing 86. Accordingly, the caliper 4*a* is displaced axially inward with respect to the support 89. The outer pad 6*c* is pressed against the axially outer surface of the rotor 9 by the pressing portion 60*a* of the caliper 4*a*. Accordingly, the rotor 9 is sandwiched from both sides in the axial direction, and the braking force is obtained. In this way, the disc brake device 1*a* obtains the braking force of the parking brake by pushing out the piston 90 using the electric actuator 12 and displacing the caliper 4*a* axially inward with respect to the support 89.

In particular, in the present example, since the unidirectional rotation regulating portion 40 is provided between the piston main body 22*a* and the piston cap 23*a*, it is possible to prevent the piston main body 22*a* from rotating with respect to the piston cap 23*a* in the forward rotation direction even when a sufficient frictional force cannot be obtained by the piston seal 30*c*. Therefore, the braking force of the parking brake can be stably obtained.

In order to release the parking brake, the spindle 82 is driven to rotate in the reverse rotation direction. Accordingly, the nut 83 is displaced axially inward with respect to the support 89. In addition, the caliper 4*a* is displaced axially outward with respect to the support 89 by displacing the spindle 82 axially outward with respect to the support 89. At this time, the outer peripheral surfaces of the pair of guide pins 96 and the inner peripheral surfaces of the pair of guide holes slide in the axial direction. In particular, in the present example, since the unidirectional rotation regulating portion 40 is provided between the piston main body 22*a* and the piston cap 23*a*, it is possible to allow the piston main body 22*a* to rotate with respect to the piston cap 23*a* in the reverse rotation direction even when the nut 83 is fully released to the side opposite to the rotor 9 due to malfunction of the electric motor or the like. Therefore, it is possible to effectively prevent a decrease in durability of the electric motor and the speed reduction mechanism composing the electric drive device 78.

Also in the case of the disc brake device 1*a* of the present example as described above, the piston 90 has a two-part structure including the piston main body 22*a* and the piston cap 23*a*, and the piston main body 22*a* and the piston cap 23*a* are connected to each other via the unidirectional rotation regulating portion 40, and thus, it is possible to stably obtain the braking force of the parking brake while preventing the temperature rise of the brake oil, and it is possible to solve the problem caused when the nut 83 is fully released to the side opposite to the rotor 9.

Other configurations and operational effects are the same as those of the first example of the embodiment.

Third Example of Embodiment

A third example of the embodiment will be described with reference to FIGS. 17A to 18B. In the present example, the same components as those of the first example of the embodiment are denoted by the same reference numerals as those of the first example of the embodiment, and a detailed description thereof will be omitted.

The present example is a modification of the first example of the embodiment, and a structure of a unidirectional rotation regulating portion 40*a* provided between a piston main body 22*b* and a piston cap 23*b* composing the dual-purpose piston 7 (see FIGS. 6A and 6B, and the like) is changed from the structure of the first example of the embodiment.

The unidirectional rotation regulating portion 40*a* of the present example not only has a function of regulating the relative rotation of the piston main body 22*b* with respect to the piston cap 23*b* in the forward rotation direction (arrow X direction in FIGS. 17A and 18A) and allowing the relative rotation in the reverse rotation direction (arrow Y direction in FIGS. 17A and 18A), but also has a function of transmitting an axial force between the piston main body 22*b* and the piston cap 23*b*.

The unidirectional rotation regulating portion 40*a* includes a main body-side sliding contact surface 99 provided on an axially outer surface of a partition wall portion 26*b* composing the piston main body 22*b*, and a cap-side sliding contact surface 100 provided on an axially inner end surface of a cylindrical portion 32*b* composing the piston cap 23*b*. The main body-side sliding contact surface 99 and the cap-side sliding contact surface 100 are disposed to face each other in the axial direction.

Figure 17A:
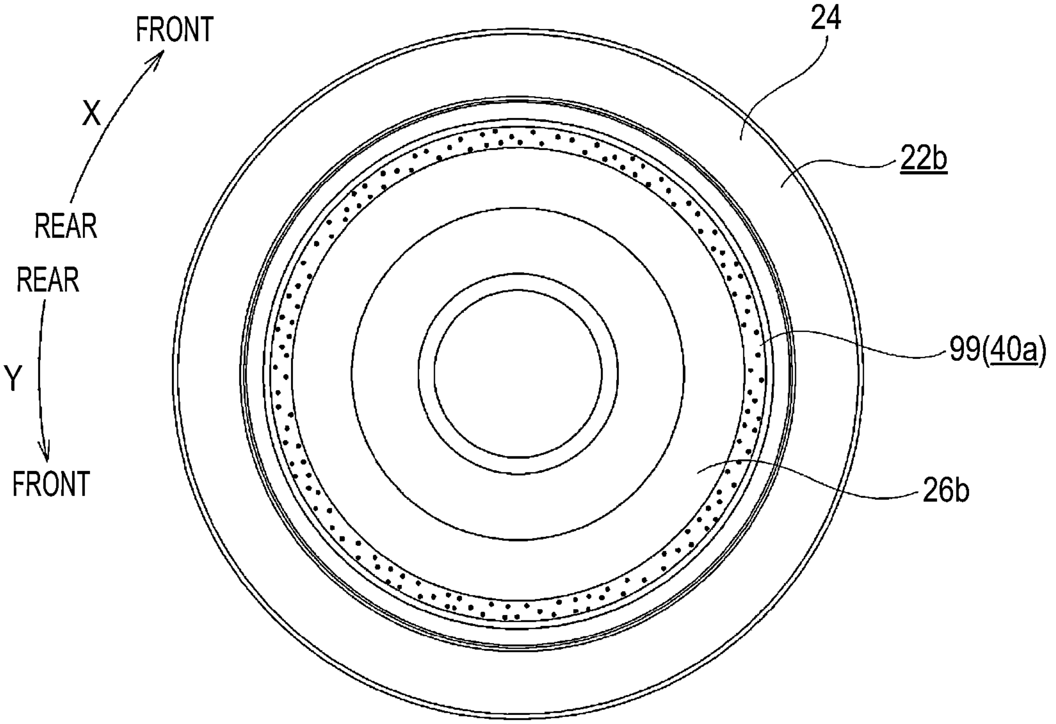
FIGS. 17A and 17B are views that illustrate a third example of the embodiment and correspond to FIGS. 7A and 7B.
Figure 17B:
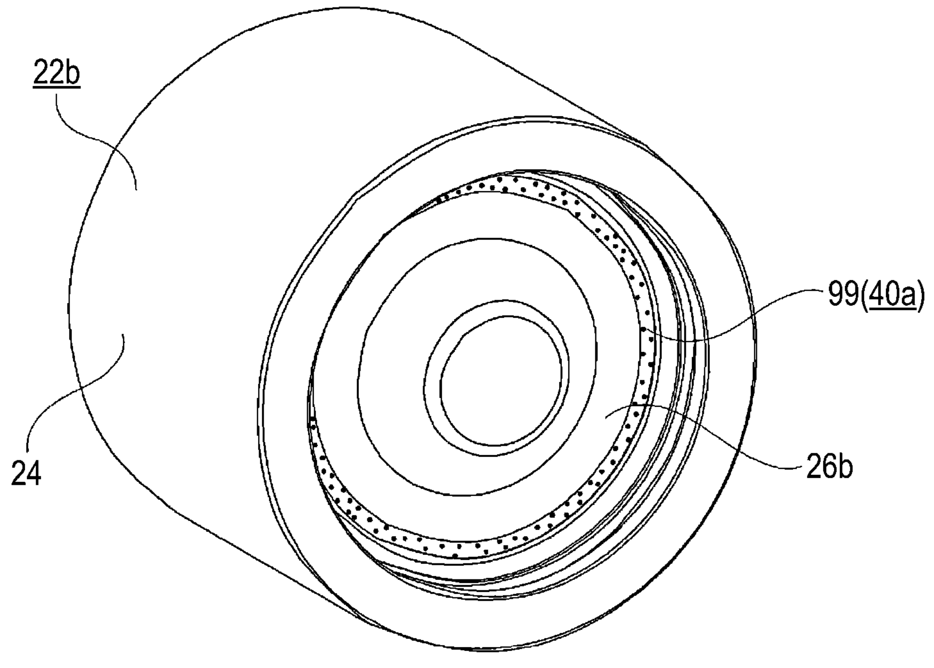

As shown in FIGS. 17A and 17B, the main body-side sliding contact surface 99 is formed in a flat surface shape, and is disposed on a virtual plane orthogonal to a central axis of the piston main body 22*b*. The main body-side sliding contact surface 99 has an annular shape, and is subjected to surface processing for increasing a friction coefficient between the main body-side sliding contact surface 99 and the cap-side sliding contact surface 100. Specifically, the main body-side sliding contact surface 99 is subjected to a surface roughening process, and is a rough surface having a larger surface roughness than the other portions of the partition wall portion 26*b*.

Figure 18A:
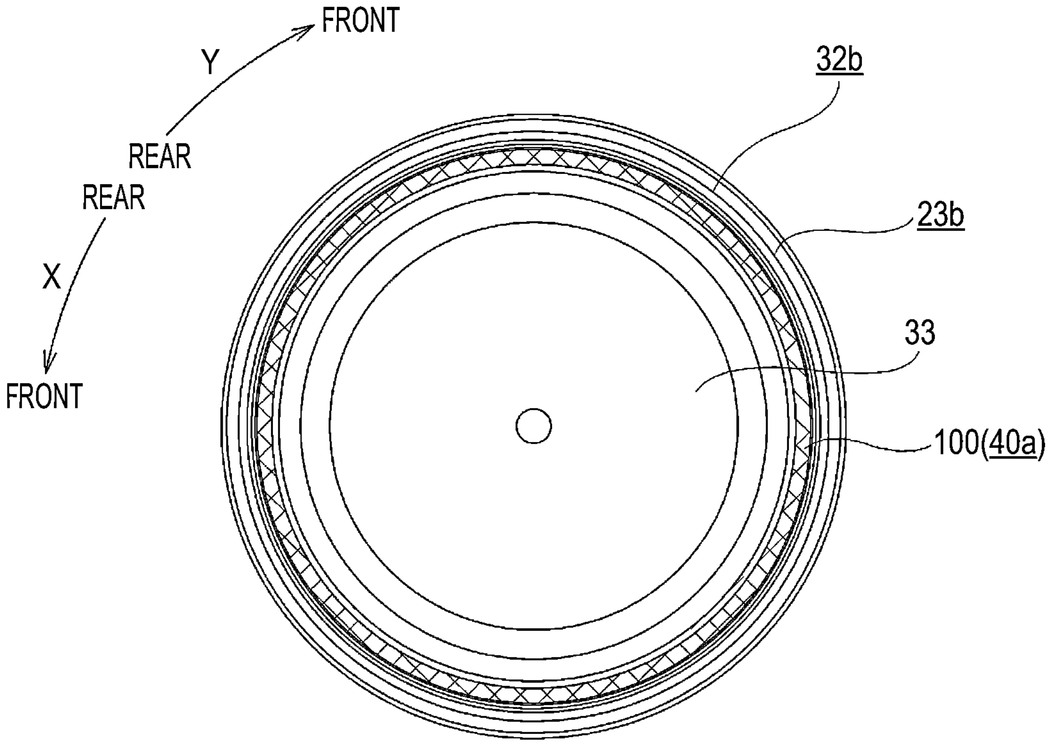
FIGS. 18A and 18B are view that illustrate the third example of the embodiment and correspond to FIGS. 9A and 9B.
Figure 18B:
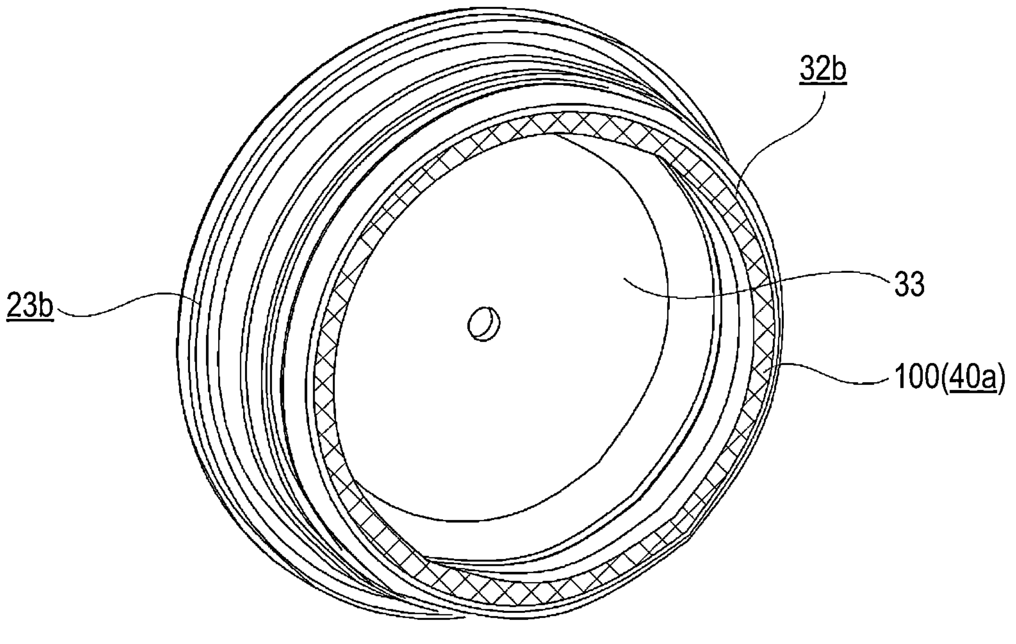

As shown in FIGS. 18A and 18B, the cap-side sliding contact surface 100 is formed in a flat surface shape, and is disposed on a virtual plane orthogonal to a central axis of the piston cap 23*b*. The cap-side sliding contact surface 100 has an annular shape, and includes a friction member in order to increase a friction coefficient between the main body-side sliding contact surface 99 and the cap-side sliding contact surface 100. Specifically, the cap-side sliding contact surface 100 is made of an elastic material such as rubber.

In the disc brake device of the present example including the unidirectional rotation regulating portion 40*a*, when the spindle 82 (see FIG. 3 and the like) is driven to rotate in the forward rotation direction to obtain a braking force of a parking brake, the nut 83 (see FIG. 3 and the like) is moved axially outward to press the distal end portion of the nut 83 against an axially inner surface of the partition wall portion 26*b* of the piston main body 22*b*, similarly to the structure of the first example of the embodiment. The dual-purpose piston 7 is pushed out toward the rotor 9 (see FIG. 2), and the inner pad 6*b* (see FIG. 3 and the like) is pressed against the axially inner surface of the rotor 9. In addition, a reaction force caused by the pressing is transmitted from the spindle 82 to the clamp member 5 (see FIG. 3 and the like). Accordingly, the spindle 82 and the clamp member 5 are displaced axially inward with respect to the caliper 4 (see FIG. 3 and the like). The outer pad 6*a* is pressed against the axially outer surface of the rotor 9 by the clamp member 5. Accordingly, the rotor 9 is sandwiched from both sides in the axial direction by the pair of pads 6*a* and 6*b*, and the braking force is obtained.

In particular, in the present example, since the unidirectional rotation regulating portion 40*a* is provided between the piston main body 22*b* and the piston cap 23*b*, it is possible to prevent the piston main body 22*b* from rotating with respect to the piston cap 23*b* in the forward rotation direction even when a sufficient frictional force cannot be obtained by the piston seal 30*a* (see FIG. 3). Specifically, since an axial force acting on the cap-side sliding contact surface 100 from the main body-side sliding contact surface 99 is increased by sandwiching the rotor 9 from both sides in the axial direction by the pair of pads 6*a* and 6*b*, the main body-side sliding contact surface 99 and the cap-side sliding contact surface 100 can be frictionally engaged with each other so as not to be relatively rotatable. Therefore, it is possible to prevent the piston main body 22*b* from rotating with respect to the piston cap 23*b* in the forward rotation direction, and it is possible to stably obtain the braking force of the parking brake.

In a case where the nut 83 is fully released to a side opposite to a rotor due to malfunction of the electric motor or the like when the spindle 82 is driven to rotate in the reverse rotation direction to release the braking force of the parking brake, the distal end portion of the nut 83 is separated from the axially inner surface of the partition wall portion 26*b* of the dual-purpose piston 7, or a force with which the distal end portion of the nut 83 presses the partition wall portion 26*b* is reduced. Accordingly, the axial force acting on the cap-side sliding contact surface 100 from the main body-side sliding contact surface 99 is reduced, and thus the main body-side sliding contact surface 99 can be rotated relative to the cap-side sliding contact surface 100 in the reverse rotation direction. Therefore, the piston main body 22*b* can be allowed to rotate with respect to the piston cap 23*b* in the reverse rotation direction. Therefore, it is possible to effectively prevent a decrease in durability of the electric motor and the speed reduction mechanism.

Also in the case of the disc brake device of the present example as described above, the dual-purpose piston 7 has a two-part structure including the piston main body 22*b* and the piston cap 23*b*, and the piston main body 22*b* and the piston cap 23*b* are connected to each other via the unidirectional rotation regulating portion 40*a* having the functions as described above. Therefore, it is possible to stably obtain the braking force of the parking brake while preventing the temperature rise of the brake oil, and it is possible to solve the problem caused when the nut 83 is fully released to the side opposite to the rotor 9. In addition, since it is unnecessary to separately provide a power transmitting portion, it is advantageous in reducing the size and weight of the piston main body 22*b* and the piston cap 23*b*.

Other configurations and operational effects are the same as those of the first example of the embodiment.

Fourth Example of Embodiment

Figure 19:
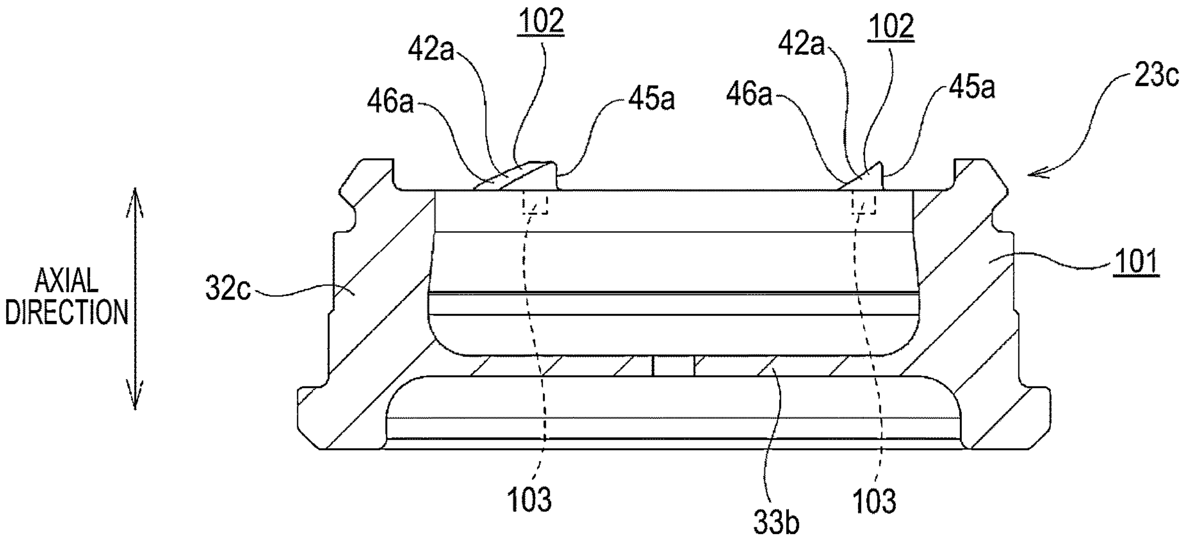
FIG. 19 is a schematic cross-sectional view of a piston cap that illustrates a fourth example of the embodiment.

A fourth example of the embodiment will be described with reference to FIG. 19. In the present example, the same components as those of the first example of the embodiment are denoted by the same reference numerals as those of the first example of the embodiment, and a detailed description thereof will be omitted.

The present example is a modification of the first example of the embodiment, and only a structure of a piston cap 23*c* composing the dual-purpose piston 7 (see FIGS. 6A and 6B, and the like) is changed from the structure of the first example of the embodiment.

The piston cap 23*c* includes a cap body 101 made of synthetic resin and a plurality of engagement pieces 102 made of metal. The cap body 101 includes a cylindrical portion 32*c* and a closing plate portion 33*b*. Each of the engagement pieces 102 includes a substantially cylindrical base portion 103 and a substantially triangular prism-shaped cap-side engagement portion 42*a*. The base portion 103 is fixed to an axially inner portion of the cylindrical portion 32*c* of the cap body 101 by molding. The cap-side engagement portion 42*a* has the same configuration as that of the first example of the embodiment, and includes a cap-side regulating surface 45*a* that is perpendicular to an axially inner end surface of the cylindrical portion 32*c*, and a cap-side guide surface 46*a* that is an inclined surface inclined with respect to the axially inner end surface of the cylindrical portion 32*c*.

In the present example having the above configuration, since most of the piston cap 23*c* is made of synthetic resin, the amount of heat transferred to the brake oil accommodated in the hydraulic chamber 28 (see FIG. 3) can be reduced as compared with the case where the piston cap is made of metal. Therefore, it is possible to effectively prevent an increase in temperature of the brake oil. Furthermore, since the cap-side engagement portion 42*a* is made of metal, the amount of wear and deformation of the cap-side engagement portion 42*a* can be reduced as compared with the case where the cap-side engagement portion 42*a* is made of synthetic resin.

Other configurations and operational effects are the same as those of the first example of the embodiment.

In the case of implementing the present invention, as a modification of the fourth example of the embodiment, the engagement piece may include a metal pin having a cylindrical shape as a whole, a base half portion of the pin may be fixed to the cap body by molding, and a distal half portion of the pin may function as a cap-side engagement portion. In this case, similarly to a cap-side engagement portion 42*c*

(see FIGS. 22A and 22B) according to a seventh example of the embodiment to be described later, the cap-side engagement portion including the distal half portion of the pin has a cap-side regulating surface on a side surface on the rear side in the forward rotation direction, but does not include a cap-side guide surface, and has a configuration in which a corner portion (including a chamfered portion) is provided between a side surface on the rear side in the reverse rotation direction and an axially distal end surface.

Fifth Example of Embodiment

Figure 20:
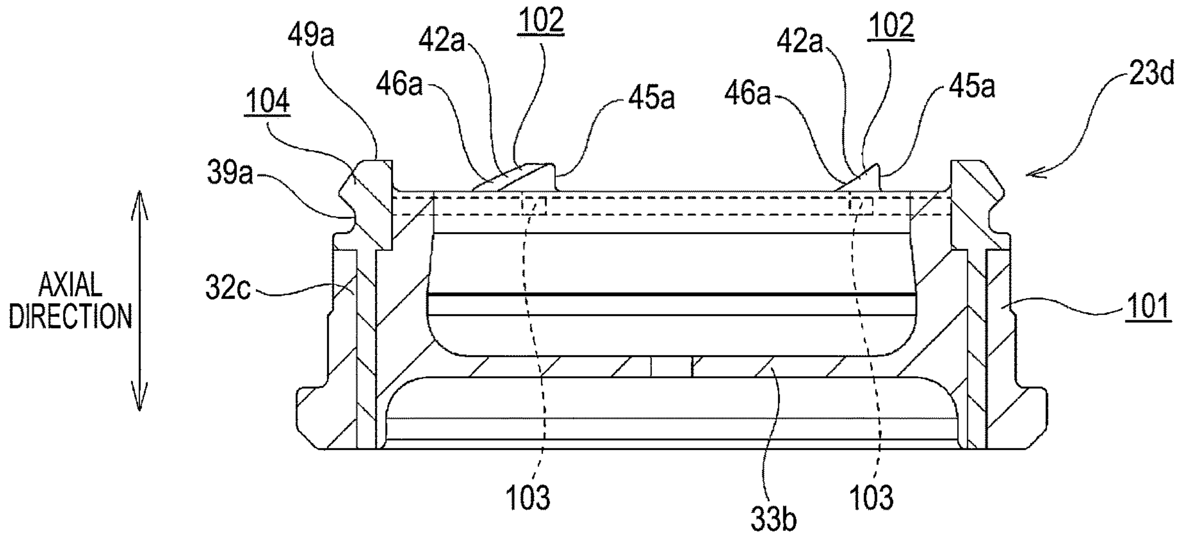
FIG. 20 is a schematic cross-sectional view of a piston cap that illustrates a fifth example of the embodiment.

A fifth example of the embodiment will be described with reference to FIG. 20. In the present example, the same components as those of the first example of the embodiment are denoted by the same reference numerals as those of the first example of the embodiment, and a detailed description thereof will be omitted.

The present example is a modification of the first example and the fourth example of the embodiment, and a structure of a piston cap 23*d* is changed from the structure of the first example of the embodiment.

The piston cap 23*d* has a configuration in which an axial force transmitting member 104 made of metal is further provided in the piston cap 23*c* (see FIG. 19) of the fourth example of the embodiment. The axial force transmitting member 104 has a substantially cylindrical shape, and is fixed to the cylindrical portion 32*c* of the cap body 101 by molding. An axially inner end surface of the axial force transmitting member 104 is exposed to an axially inner end surface of the cylindrical portion 32*c*, and the exposed end surface serves as a cap-side transmission surface 49*a*. In addition, an axially outer end surface of the axial force transmitting member 104 is also exposed to an axially outer end surface of the cylindrical portion 32*c*. An axially inner portion of the axial force transmitting member 104 is exposed to an outer peripheral surface of the cylindrical portion 32*c*, and the holding recessed groove 39*a* is provided in the portion. An axially outer portion of the axial force transmitting member 104 is molded inside the cylindrical portion 32*c*. In the present example, the axial force transmitting member 104 and the plurality of engagement pieces 102 are separated, but the power transmitting member and the plurality of engagement pieces may be integrally configured or fixed to each other.

In the present example having the above configuration, since the axial force transmitting member 104 made of metal is provided inside the cap body 101 made of synthetic resin, an axial force acting on the piston cap 23*d* can be transmitted via the axial force transmitting member 104. Therefore, strength of the piston cap 23*d* can be improved, and durability of the piston cap 23*d* can be improved.

Other configurations and operational effects are the same as those of the first example and the fourth example of the embodiment.

Sixth Example of Embodiment

A sixth example of the embodiment will be described with reference to FIGS. 21A and 21B. In the present example, the same components as those of the first example of the embodiment are denoted by the same reference numerals as those of the first example of the embodiment, and a detailed description thereof will be omitted.

The present example is a modification of the first example of the embodiment, and a structure of a cap-side engagement portion 42*b* is changed from the structure of the first example of the embodiment.

A plurality of cap-side engagement portions 42*b* are provided on an axially inner end surface of a cylindrical portion 32*d* of a piston cap 23*e*. Each of the cap-side engagement portions 42*b* has a concave shape recessed in the axial direction, and the plurality of cap-side engagement portions 42*b* are provided on the axially inner end surface of the cylindrical portion 32*d* at equal intervals in the circumferential direction. The plurality of cap-side engagement portions 42*b* are disposed on a concentric circle centered on a central axis of the piston cap 23*e*.

Each of the cap-side engagement portions 42*b* has a shape recessed in a substantially triangular prism shape, and an axial depth from the axially inner end surface of the cylindrical portion 32*d* varies in the circumferential direction. Specifically, each of the cap-side engagement portions 42*b* has a shape in which the axial depth gradually increases from the rear to the front in the forward rotation direction (arrow X direction in FIGS. 21A and 21B) (from the front to the rear in the reverse rotation direction (arrow Y direction in FIGS. 21A and 21B)). Therefore, in the cap-side engagement portion 42*b*, an axial depth of an end portion on the front side in the forward rotation direction is the largest, and an axial depth of an end portion on the rear side in the forward rotation direction is the smallest.

Each of the cap-side engagement portions 42*b* has a cap-side regulating surface 45*b* on a side surface on the front side in the forward rotation direction. The cap-side regulating surface 45*b* is formed in a flat surface shape, and is disposed parallel to the central axis of the piston cap 23*e*. That is, the cap-side regulating surface 45*b* is a right angle surface perpendicular to the axially inner end surface of the cylindrical portion 32*d*. In the present example, the cap-side regulating surface 45*b* is disposed on a virtual plane including the central axis of the piston cap 23*e*. When the spindle 82 (see FIG. 3 and the like) is driven to rotate in the forward rotation direction, the cap-side regulating surface 45*b* comes into surface contact with the main body-side regulating surface 43 provided in the main body-side engagement portion 41.

Each of the cap-side engagement portions 42*b* has a cap-side guide surface 46*b* on an axial bottom surface thereof. The cap-side guide surface 46*b* is formed in a flat surface shape, and is an inclined surface linearly inclined in a direction in which the cap-side guide surface 46*b* is away from the rotor 9 as the cap-side guide surface 46*b* extends forward from the rear in the reverse rotation direction. That is, the cap-side guide surface 46*b* is an inclined surface inclined with respect to the axially inner end surface of the cylindrical portion 32*d*. When the spindle 82 is driven to rotate in the reverse rotation direction, the cap-side guide surface 46*b* comes into contact with the main body-side guide surface 44 provided in the main body-side engagement portion 41. The cap-side guide surface 46*b* and the cap-side regulating surface 45*b* are connected to each other via a chamfered portion.

Figure 21A:
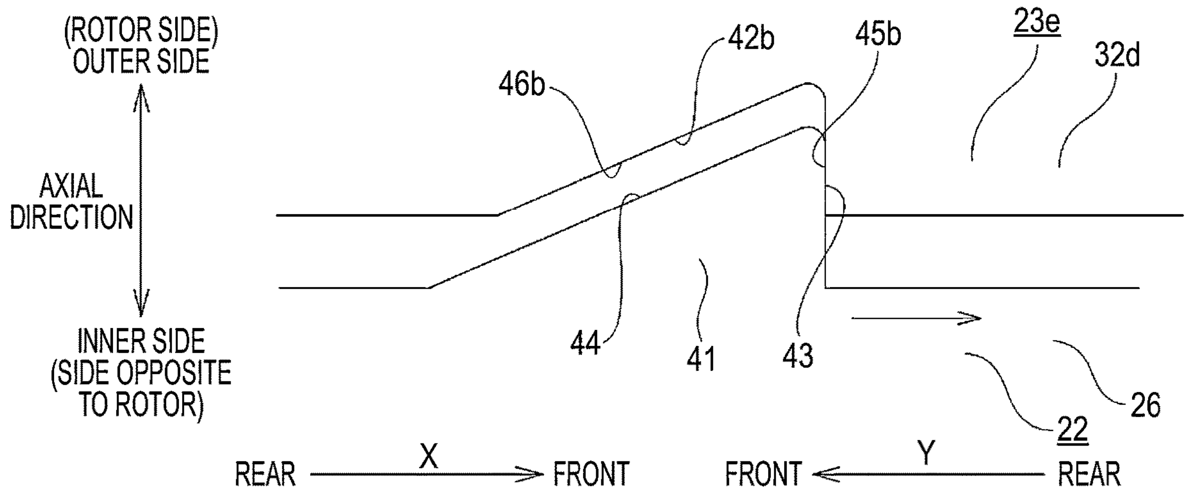
FIGS. 21A and 21B are schematic diagram that show a sixth example of the embodiment and correspond to FIGS. 12A and 12B.

Also in the case of the present example having the above configuration, as shown in FIG. 21A, when the spindle 82 is driven to rotate in the forward rotation direction, the main body-side regulating surfaces 43, which are right angle surfaces, simultaneously come into surface contact with the cap-side regulating surfaces 45*b*, which are right angle surfaces, and the main body-side engagement portions 41 and the cap-side engagement portions 42*b* are mechanically engaged with each other. Therefore, when the spindle 82 is driven to rotate in the forward rotation direction, the relative rotation of the piston main body 22 with respect to the piston cap 23*e* in the forward rotation direction is regulated.

Figure 21B:
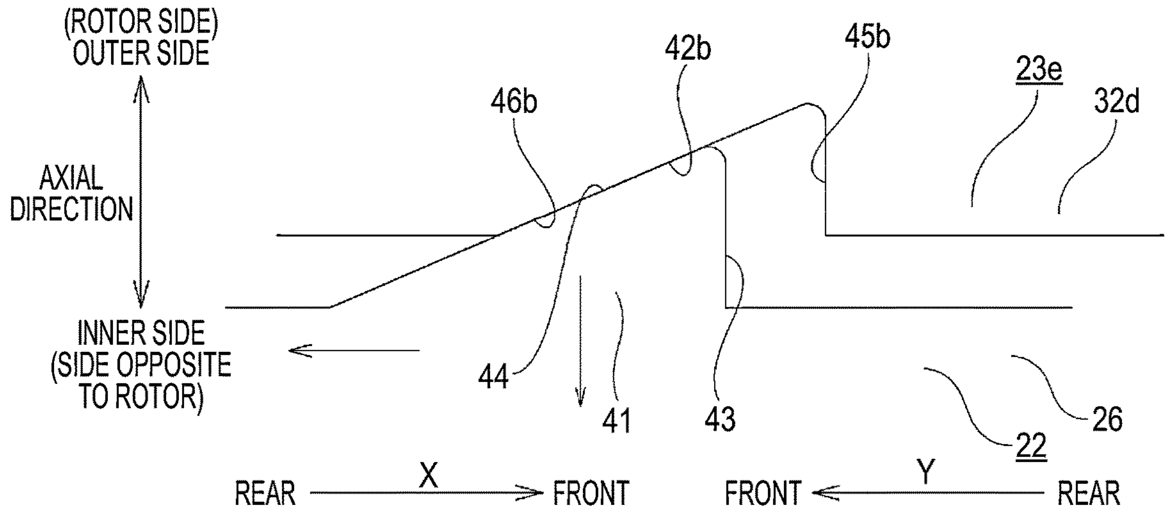

On the contrary, as shown in FIG. 21B, when the spindle 82 is driven to rotate in the reverse rotation direction, the main body-side guide surfaces 44, which are inclined surfaces, simultaneously come into contact with the cap-side guide surfaces 46*b*, which are inclined surfaces. Therefore, the cap-side guide surface 46*b* can push up the main body-side guide surface 44 in the axial direction (move the main body-side guide surface 44 to the side opposite to the rotor 9) by using the inclination. Accordingly, the relative rotation (displacement) of the piston main body 22 with respect to the piston cap 23*e* in the reverse rotation direction is allowed.

In the present example having the above configuration, since the main body-side engagement portion 41 can be disposed inside the cap-side engagement portion 42*b*, it is advantageous in terms of shortening an axial dimension of the dual-purpose piston 7.

Other configurations and operational effects are the same as those of the first example of the embodiment.

In the case of implementing the present invention, as a modification of the sixth example of the embodiment, each of the main body-side engagement portions may have a concave shape recessed in the axial direction, and each of the cap-side engagement portions may have a convex shape protruding in the axial direction.

Seventh Example of Embodiment

A seventh example of the embodiment will be described with reference to FIGS. 22A and 22B. In the present example, the same components as those of the first example of the embodiment are denoted by the same reference numerals as those of the first example of the embodiment, and a detailed description thereof will be omitted.

The present example is a modification of the first example of the embodiment, and structures of a main body-side engagement portion 41*b* and a cap-side engagement portion 42*c* are changed from the structure of the first example of the embodiment.

Each of the main body-side engagement portions 41*b* has a substantially fan shape as viewed in the axial direction, and has a substantially quadrant shape as viewed in the radial direction. Therefore, each of the main body-side engagement portions 41*b* has an axial height from a partition wall portion 26*c* that varies in the circumferential direction.

Each of the main body-side engagement portions 41*b* has a main body-side regulating surface 43*a* on a side surface on the front side in the forward rotation direction, and has a main body-side guide surface 44*b* on an axially distal end surface. The main body-side guide surface 44*b* is a curved surface (partially cylindrical surface) curved in a direction in which the main body-side guide surface 44*b* is close to the rotor 9 as the main body-side guide surface 44*b* extends rearward from the front in the reverse rotation direction.

Each of the cap-side engagement portions 42*c* has a substantially rectangular parallelepiped shape, and has a substantially fan shape as viewed in the axial direction and a rectangular shape as viewed in the radial direction. Therefore, each of the cap-side engagement portions 42*c* has an axial height from an axially inner end surface of a cylindrical portion 32*e* that is constant in the circumferential direction.

Each of the cap-side engagement portions 42*c* has a cap-side regulating surface 45*c* on a side surface on the rear side in the forward rotation direction. In the present example, an axially distal end surface of the cap-side engagement portion 42*c* is a flat surface parallel to the axially inner end surface of the cylindrical portion 32*e*, and a cap-side guide surface is not provided. Each of the cap-side engagement portions 42*c* has a corner portion (including a chamfered portion) 105 between a side surface on the rear side in the reverse rotation direction and the axially distal end surface.

Figure 22A:
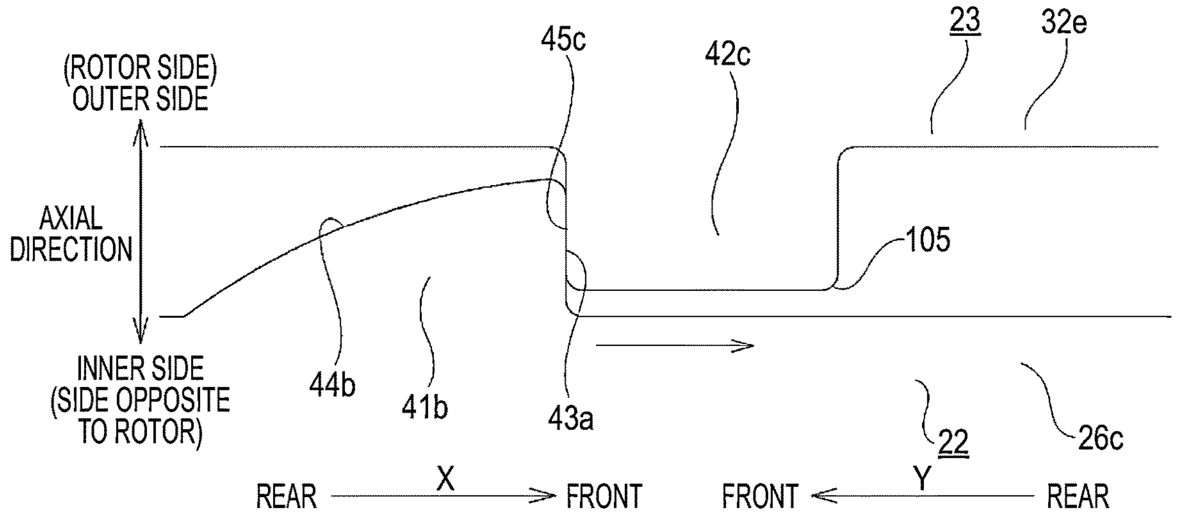
FIGS. 22A and 22B are schematic diagram that show a seventh example of the embodiment and correspond to FIGS. 12A and 12B.

Also in the case of the present example having the above configuration, as shown in FIG. 22A, when the spindle 82 (see FIG. 3 and the like) is driven to rotate in the forward rotation direction, the main body-side regulating surfaces 43*a* simultaneously come into surface contact with the cap-side regulating surfaces 45*c*, and the main body-side engagement portions 41*b* and the cap-side engagement portions 42*c* are mechanically engaged with each other. Therefore, when the spindle 82 is driven to rotate in the forward rotation direction, the relative rotation of the piston main body 22 with respect to the piston cap 23 in the forward rotation direction is regulated.

Figure 22B:
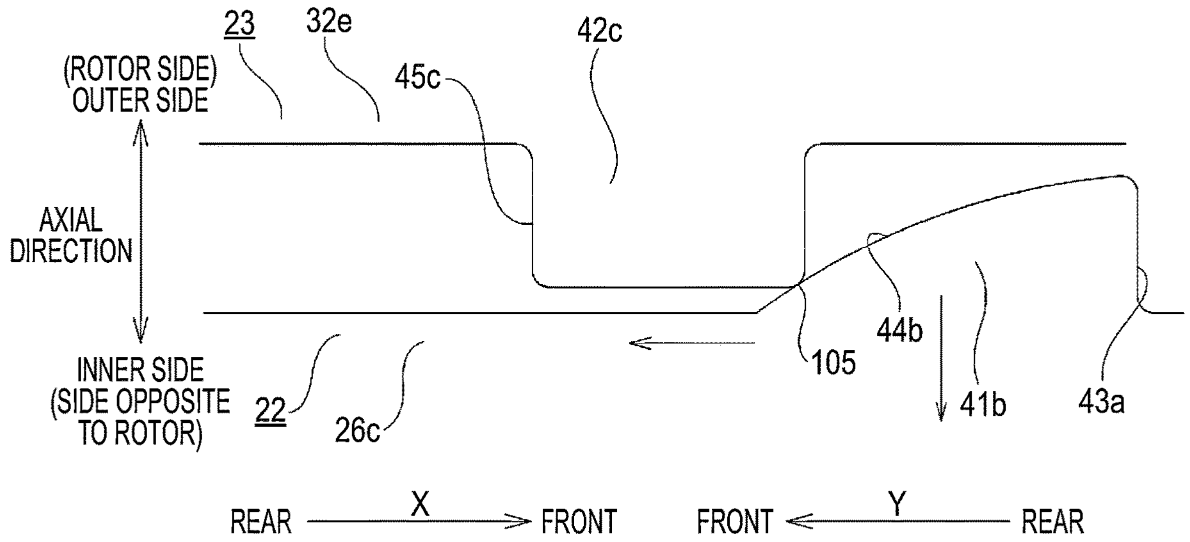

On the contrary, as shown in FIG. 22B, when the spindle 82 is driven to rotate in the reverse rotation direction, the main body-side guide surfaces 44*b*, which are curved surfaces of the main body-side engagement portions 41*b*, simultaneously come into contact with the corner portions 105 of the cap-side engagement portions 42*c*. Therefore, the corner portion 105 can push up the main body-side guide surface 44*b* in the axial direction (move the main body-side guide surface 44*b* to the side opposite to the rotor 9) by using the curved surface of the main body-side guide surface 44*b*. Accordingly, the relative rotation (displacement) of the piston main body 22 with respect to the piston cap 23 in the reverse rotation direction is allowed.

In the case of the present example having the above configuration, since a configuration of the cap-side engagement portion 42*c* can be simplified, manufacturing cost of the piston cap 23 can be reduced.

Other configurations and operational effects are the same as those of the first example of the embodiment.

In the case of implementing the present invention, as a first example of a modification of the seventh example of the embodiment, each of the main body-side engagement portions may have a structure including a corner portion instead of the main body-side guide surface, and each of the cap-side engagement portions may have a structure including a cap-side guide surface that is a curved surface. In addition, as a second example of the modification, one of the main body-side engagement portion and the cap-side engagement portion may have a structure including a corner portion, and the other may have a structure including an inclined surface as a guide surface. In addition, as a third example of the modification, one of the main body-side engagement portion and the cap-side engagement portion may have a shape with a curved guide surface, and the other may have a structure including an inclined guide surface.

Although the embodiment of the present invention has been described above, the present invention is not limited thereto, and can be appropriately changed without departing from the technical idea of the invention. In addition, the structures of the examples of the embodiment can be appropriately combined and implemented as long as no contradiction occurs.

The present invention is not limited to the embodiment, and for example, the shapes and the numbers of the convex or concave main body-side engagement portions and cap-side engagement portions composing the unidirectional rotation regulating portion, the surface properties of the main body-side sliding contact surface and the cap-side sliding contact surface composing the unidirectional rotation regulating portion, the type of the friction member, and the like can be appropriately changed.

Here, features of the embodiment of the disc brake device according to the present invention described above will be briefly summarized and listed below.

<1> A disc brake device (1, 1a) including:

a pad (6b, 6a);

a caliper (4) including a cylinder (11a) having an opening on a pad side;

a piston (7) fitted to the cylinder and configured to press the pad toward a rotor; and a rotary-to-linear motion conversion mechanism (79) configured to convert a rotary motion of a drive source into a linear motion to push the piston toward the rotor, in which a braking force of a service brake is generated by feeding brake oil into the cylinder, and a braking force of a parking brake is generated by operating the rotary-to-linear motion conversion mechanism, the piston is divided into two parts that are a piston main body (22, 22a, 22b) and a piston cap (23, 23a, 23b, 23c, 23d) in an axial direction, and the rotary-to-linear motion conversion mechanism (79) includes:

a rotary member (spindle 82) configured to be driven to rotate by the drive source; and a linear motion member (nut 83) screwed to the rotary member, disposed inside the piston main body, engaged with the piston main body so as not to be rotatable relative to the piston main body, and configured to press the piston main body in the axial direction; and the disc brake device includes a unidirectional rotation regulating portion (40, 40a) provided between the piston main body and the piston cap, configured to regulate relative rotation of the piston main body in a forward rotation direction with respect to the piston cap when the rotary member is driven to rotate in the forward rotation direction to move the linear motion member to a rotor side, and configured to allow relative rotation of the piston main body in a reverse rotation direction with respect to the piston cap when the rotary member is driven to rotate in the reverse rotation direction to move the linear motion member to a side opposite to the rotor.

<2> The disc brake device (1, 1a) according to <1>, in which the unidirectional rotation regulating portion includes at least one convex or concave main body-side engagement portion (41, 41b) provided in the piston main body, and at least one convex or concave cap-side engagement portion (42, 42a, 42b, 42c) provided in the piston cap and mechanically engaged with the main body-side engagement portion when the rotary member is driven to rotate in the forward rotation direction.

<3> The disc brake device (1, 1a) according to <2>, in which at least one of a portion of the main body-side engagement portion configured to come into contact with the cap-side engagement portion when the rotary member is driven to rotate in the forward rotation direction and a portion of the cap-side engagement portion configured to come into contact with the main body-side engagement portion when the rotary member is driven to rotate in the forward rotation direction has a regulating surface (main body-side regulating surfaces 43, 43a and cap-side regulating surfaces 45, 45a, 45b, 45c) parallel to a central axis of the piston.

<4> The disc brake device (1, 1a) according to <2> or <3>, in which the main body-side engagement portion has a main body-side guide surface (44) at a portion configured to come into contact with the cap-side engagement portion when the rotary member is driven to rotate in the reverse rotation direction, the main body-side guide surface being close to the rotor in the axial direction as the main body-side guide surface extends rearward in a reverse rotation direction, and the cap-side engagement portion is configured to push up the main body-side guide surface when the rotary member is driven to rotate in the reverse rotation direction.

<5> The disc brake device (1, 1a) according to <4>, in which the main body-side guide surface (44) is an inclined surface or a curved surface.

<6> The disc brake device (1, 1a) according to any one of <2> to <5>, in which the cap-side engagement portion has a cap-side guide surface (46, 46a, 46b) at a portion configured to come into contact with the main body-side engagement portion when the rotary member is driven to rotate in the reverse rotation direction, the cap-side guide surface being away from the rotor in the axial direction as the cap-side guide surface extends forward in the reverse rotation direction, and the cap-side guide surface configured to push up the main body-side engagement portion when the rotary member is driven to rotate in the reverse rotation direction.

<7> The disc brake device (1, 1a) according to <6>, in which the cap-side guide surface (46, 46a, 46b) is an inclined surface or a curved surface.

<8> The disc brake device (1, 1a) according to any one of <2> to <7>, in which at least the cap-side engagement portion (42, 42a, 42b, 42c) of the piston cap is made of metal.

<9> The disc brake device (1, 1a) according to any one of <2> to <8>, in which the main body-side engagement portion includes a plurality of main body-side engagement portions (41, 41b) provided so as to be spaced apart from each other in a circumferential direction, and the cap-side engagement portion includes a plurality of cap-side engagement portions (42, 42a, 42b, 42c) provided so as to be spaced apart from each other in the circumferential direction.

<10> The disc brake device (1, 1a) according to <9>, in which the plurality of main body-side engagement portions (41, 41b) are disposed at equal intervals in the circumferential direction, and the plurality of cap-side engagement portions (42, 42a, 42b, 42c) are disposed at equal intervals in the circumferential direction.

<11> The disc brake device (1, 1a) according to any one of <2> to <10>, in which the piston cap (23, 23a, 23b, 23c, 23d) is supported so as to be displaceable relative to the piston main body in the axial direction.

<12> The disc brake device (1, 1a) according to <11>, in which the piston cap (23, 23*a*, 23*b*, 23*c*, 23*d*) is supported so as to be displaceable relative to the piston main body in the axial direction at least as much as the main body-side engagement portion gets over the cap-side engagement portion when the rotary member is driven to rotate in the reverse rotation direction.

<13> The disc brake device (1, 1*a*) according to any one of <1> to <12>, further including:

an axial force transmitting portion (47) provided between the piston main body and the piston cap and configured to transmit an axial force between the piston main body and the piston cap, and the axial force transmitting portion is provided separately from the unidirectional rotation regulating portion.

<14> The disc brake device (1, 1*a*) according to <13>, in which the axial force transmitting portion includes a flat main body-side transmission surface (48) of the piston main body located on a virtual plane orthogonal to a central axis of the piston main body and a flat cap-side transmission surface (49, 49*a*) of the piston cap located on a virtual plane orthogonal to a central axis of the piston cap.

<15> The disc brake device (1*a*) according to <1>, in which the unidirectional rotation regulating portion (40*a*) is configured to transmit an axial force between the piston main body and the piston cap.

<16> The disc brake device (1*a*) according to <15>, in which the unidirectional rotation regulating portion (40*a*) includes a main body-side sliding contact surface (99) provided on the piston main body and a cap-side sliding contact surface (100) provided on the piston cap and opposed to the main body-side sliding contact surface in the axial direction, at least one of the main body-side sliding contact surface and the cap-side sliding contact surface is subjected to surface processing for increasing a friction coefficient between the main body-side sliding contact surface and the cap-side sliding contact surface, or includes a friction member, and when the rotary member is driven to rotate in a forward rotation direction, the main body-side sliding contact surface and the cap-side sliding contact surface are frictionally engaged so as not to rotate relative to each other with an increase in an axial force acting on the cap-side sliding contact surface from the main body-side sliding contact surface, and when the rotary member is driven to rotate in a reverse rotation direction, the main body-side sliding contact surface relatively rotates in the reverse rotation direction with respect to the cap-side sliding contact surface with a decrease in the axial force acting on the cap-side sliding contact surface from the main body-side sliding contact surface.

<17> The disc brake device (1*a*) according to any one of <1> to <16>, further including:

the drive source, in which the drive source is an electric motor.

The present application is based on a Japanese Patent Application (Japanese Patent Application No. 2020-125242) filed on Jul. 22, 2020, and the content thereof is incorporated herein as reference.

INDUSTRIAL APPLICABILITY

According to the disc brake device of the present invention, it is possible to implement a disc brake device that can stably obtain a braking force of a parking brake while preventing a temperature rise of brake oil, and can solve a problem caused when a linear motion member is fully released to a side opposite to a rotor.

REFERENCE SIGNS LIST

1, 1*a*: disc brake device
2: opposed piston type brake mechanism
3: floating type brake mechanism
4, 4*a*: caliper
5: clamp member
6*a*, 6*c*: outer pad
6*b*, 6*d*: inner pad
7: dual-purpose piston
8: service-dedicated piston
9: rotor
10*a*: rotation-in side outer cylinder
10*b*: rotation-out side outer cylinder
11*a*: rotation-in side inner cylinder
11*b*: rotation-out side inner cylinder
12: actuator
13: outer body portion
14: inner body portion
15*a*: rotation-in side coupling portion
15*b*: rotation-out side coupling portion
16: intermediate coupling portion
17: attachment seat
18*a*, 18*b*: oil passage
19: large diameter hole portion
20: small diameter hole portion
21: guide cylinder
22, 22*a*, 22*b*: piston main body
23, 23*a*, 23*b*, 23*c*, 23*d*: piston cap
24: large diameter cylindrical portion
25: small diameter cylindrical portion
26, 26*a*, 26*b*, 26*c*: partition wall portion
27: bottom surface
28: hydraulic chamber
29, 29*a*: female spline
30*a*, 30*b*, 30*c*: piston seal
31*a*, 31*b*, 31*c*: seal groove
32, 32*a*, 32*b*, 32*c*, 32*d*, 32*e*: cylindrical portion
33, 33*a*, 33*b*: closing plate portion
34: engagement recess
35: engagement protrusion
36, 36*a*: piston boot
37: annular recessed groove
38, 38*a*: piston ring
39, 39*a*: holding recessed groove
40, 40*a*: unidirectional rotation regulating portion
41, 41*b*: main body-side engagement portion
42, 42*a*, 42*b*, 42*c*: cap-side engagement portion
43, 43*a*: main body-side regulating surface
44: main body-side guide surface
45, 45*a*, 45*b*, 45*c*: cap-side regulating surface
46, 46*a*, 46*b*: cap-side guide surface
47: axial force transmitting portion
48: main body-side transmission surface
49, 49*a*: cap-side transmission surface
50: hydraulic chamber
51: seal groove
52: piston seal
53: dust cover
54: bleeder screw
55*a*, 55*b*: guide wall portion
56*a*, 56*b*: guide recessed groove

57: lining
58: back plate
59: ear portion
60, 60*a*: pressing portion
61, 61*a*: clamp base portion
62, 62*a*: bridge portion
63, 63*a*: base body
64, 64*a*: arm portion
65: accommodation portion
66, 66*a*: bottom portion
67, 67*a*: through hole
68: support cylindrical portion
69: first guide portion
70: second guide portion
71: third guide portion
72: seal groove
73: seal member
74: dust cover
75: inner guide pin
76: protruding support portion
77: outer guide pin
78: electric drive device
79: rotary-to-linear motion conversion mechanism
80: casing
81: rotation shaft
82: spindle
83: nut
84: male screw portion
85: flange portion
86: thrust bearing
87: female screw portion
88: male spline
89: support
90: piston
91: support base portion
92: outer coupling portion
93: coupling arm portion
94: attachment hole
95: cylinder
96: guide pin
97: boot
98: hydraulic chamber
99: main body-side sliding contact surface
100: cap-side sliding contact surface
101: cap body
102: engagement piece
103: base portion
104: axial force transmitting member
105: corner portion
106: cylindrical portion
107: lid portion

What is claimed is:

1. A disc brake device comprising:

a pad;

a caliper including a cylinder having an opening on a pad side;

a piston fitted to the cylinder and configured to press the pad toward a rotor; and a rotary-to-linear motion conversion mechanism configured to convert a rotary motion of a drive source into a linear motion to push the piston toward the rotor, wherein a braking force of a service brake is generated by feeding brake oil into the cylinder, and a braking force of a parking brake is generated by operating the rotary-to-linear motion conversion mechanism, the piston is divided into two parts that are a piston main body and a piston cap in an axial direction, the rotary-to-linear motion conversion mechanism includes:

a rotary member configured to be driven to rotate by the drive source; and a linear motion member screwed to the rotary member, disposed inside the piston main body, engaged with the piston main body so as not to be rotatable relative to the piston main body, and configured to press the piston main body in the axial direction;

the disc brake device includes a unidirectional rotation regulating portion provided between the piston main body and the piston cap, configured to regulate relative rotation of the piston main body in a forward rotation direction with respect to the piston cap when the rotary member is driven to rotate in the forward rotation direction to move the linear motion member to a rotor side, and configured to allow relative rotation of the piston main body in a reverse rotation direction with respect to the piston cap when the rotary member is driven to rotate in the reverse rotation direction to move the linear motion member to a side opposite to the rotor, the unidirectional rotation regulating portion is configured to transmit an axial force between the piston main body and the piston cap, the unidirectional rotation regulating portion includes a main body-side sliding contact surface provided on the piston main body and a cap-side sliding contact surface provided on the piston cap and opposed to the main body-side sliding contact surface in the axial direction, at least one of the main body-side sliding contact surface and the cap-side sliding contact surface is subjected to surface processing for increasing a friction coefficient between the main body-side sliding contact surface and the cap-side sliding contact surface, or includes a friction member, when the rotary member is driven to rotate in a forward rotation direction, the main body-side sliding contact surface and the cap-side sliding contact surface are frictionally engaged so as not to rotate relative to each other with an increase in an axial force acting on the cap-side sliding contact surface from the main body-side sliding contact surface, and when the rotary member is driven to rotate in a reverse rotation direction, the main body-side sliding contact surface relatively rotates in the reverse rotation direction with respect to the cap-side sliding contact surface with a decrease in the axial force acting on the cap-side sliding contact surface from the main body-side sliding contact surface.

2. The disc brake device according to claim 1, wherein the unidirectional rotation regulating portion includes at least one convex or concave main body-side engagement portion provided in the piston main body, and at least one convex or concave cap-side engagement portion provided in the piston cap and mechanically engaged with the main body-side engagement portion when the rotary member is driven to rotate in the forward rotation direction.

3. The disc brake device according to claim 2, wherein at least one of a portion of the main body-side engagement portion configured to come into contact with the cap-side engagement portion when the rotary member is driven to rotate in the forward rotation direction and a portion of the cap-side engagement portion configured to come into contact with the main body-side engagement portion when the rotary member is driven to rotate in the forward rotation direction has a regulating surface parallel to a central axis of the piston.

4. The disc brake device according to claim 2, wherein the piston main body includes a partition portion, the main body-side engagement portion has a main body-side guide surface at a portion configured to come into contact with the cap-side engagement portion when the rotary member is driven to rotate in the reverse rotation direction, the main body-side guide surface being shaped such that an axial distance between the main body-side guide surface and an axially outer surface of the partition wall portion increases as the main body-side guide surface extends rearward in a reverse rotation direction, and the cap-side engagement portion is configured to push up the main body-side guide surface when the rotary member is driven to rotate in the reverse rotation direction.

5. The disc brake device according to claim 4, wherein the main body-side guide surface is an inclined surface or a curved surface.

6. The disc brake device according to claim 2, wherein the piston cap includes a cylindrical portion, the cap-side engagement portion has a cap-side guide surface at a portion configured to come into contact with the main body-side engagement portion when the rotary member is driven to rotate in the reverse rotation direction, the cap-side guide surface being shaped such that an axial distance between the cap-side guide surface and an axially inner end surface of the cylindrical portion increases as the cap-side guide surface extends forward in the reverse rotation direction, and the cap-side guide surface is configured to push up the main body-side engagement portion when the rotary member is driven to rotate in the reverse rotation direction.

7. The disc brake device according to claim 6, wherein the cap-side guide surface is an inclined surface or a curved surface.

8. The disc brake device according to claim 2, wherein at least the cap-side engagement portion of the piston cap is made of metal.

9. The disc brake device according to claim 2, wherein the main body-side engagement portion includes a plurality of main body-side engagement portions provided so as to be spaced apart from each other in a circumferential direction, and the cap-side engagement portion includes a plurality of cap-side engagement portions provided so as to be spaced apart from each other in the circumferential direction.

10. The disc brake device according to claim 9, wherein the plurality of main body-side engagement portions are disposed at equal intervals in the circumferential direction, and the plurality of cap-side engagement portions are disposed at equal intervals in the circumferential direction.

11. The disc brake device according to claim 2, wherein the piston cap is supported so as to be displaceable relative to the piston main body in the axial direction.

12. The disc brake device according to claim 11, wherein the piston cap is supported so as to be displaceable relative to the piston main body in the axial direction at least as much as the main body-side engagement portion gets over the cap-side engagement portion when the rotary member is driven to rotate in the reverse rotation direction.

13. The disc brake device according to claim 1, further comprising:

an axial force transmitting portion provided between the piston main body and the piston cap and configured to transmit an axial force between the piston main body and the piston cap, and the axial force transmitting portion is provided separately from the unidirectional rotation regulating portion.

14. The disc brake device according to claim 13, wherein the axial force transmitting portion includes a flat main body-side transmission surface of the piston main body located on a virtual plane orthogonal to a central axis of the piston main body and a flat cap-side transmission surface of the piston cap located on a virtual plane orthogonal to a central axis of the piston cap.

15. The disc brake device according to claim 1, further comprising:

the drive source, wherein the drive source is an electric motor.

* * * * *